United States Patent
Dwyre et al.

(10) Patent No.: US 9,785,931 B2
(45) Date of Patent: Oct. 10, 2017

(54) METHODS AND SYSTEMS FOR BULK ACTIVATION OF MULTIPLE, DISPARATE STORED VALUE ACCOUNTS

(71) Applicant: ValueLink, LLC, Greenwood Village, CO (US)

(72) Inventors: Douglas P. Dwyre, Castle Rock, CO (US); Steven E. Arthur, Castle Rock, CO (US); Christopher L. Toomer, Parker, CO (US); Kenneth Algiene, Greenwood Village, CO (US)

(73) Assignee: VALUELINK, LLC, Greenwood Village, CO (US)

( * ) Notice: Subject to any disclaimer, the term of this patent is extended or adjusted under 35 U.S.C. 154(b) by 499 days.

(21) Appl. No.: 14/036,347

(22) Filed: Sep. 25, 2013

(65) Prior Publication Data
US 2014/0089114 A1   Mar. 27, 2014

Related U.S. Application Data

(63) Continuation of application No. 11/837,252, filed on Aug. 10, 2007, now Pat. No. 8,554,614, which is a
(Continued)

(51) Int. Cl.
*G06Q 30/00* (2012.01)
*G06Q 20/20* (2012.01)
(Continued)

(52) U.S. Cl.
CPC .......... *G06Q 20/208* (2013.01); *G06K 19/00* (2013.01); *G06Q 40/00* (2013.01)

(58) Field of Classification Search
CPC ...... G06Q 20/10; G06Q 20/12; G06Q 20/045; G06Q 20/354
(Continued)

(56) References Cited

U.S. PATENT DOCUMENTS 4,554,446 A   11/1985   Murphy et al.
5,200,889 A    4/1993   Mori
(Continued)

FOREIGN PATENT DOCUMENTS

EP   911772      4/1999
EP   0949596 A2  10/1999
(Continued)

OTHER PUBLICATIONS

Amerinet, Inc., "Debit-it!—The Best Idea In Payment Systems Since the Credit Card", downloaded from website http://www.debit-it.com/ on Feb. 7, 2000, 8 pages.
(Continued)

*Primary Examiner* — Rokib Masud
(74) *Attorney, Agent, or Firm* — Kilpatrick Townsend & Stockton LLP

(57) ABSTRACT

According to one embodiment of the invention, a method of activating a plurality of disparate stored value accounts utilizes a set of multiple presentation instruments redeemable at different merchants. Each presentation instrument includes a unique presentation instrument identifier used to associate value with the presentation instrument. Also, the set includes a set identifier, which may be included on a package that secures the presentation instruments together. In one embodiment, the set identifier is received over an electronic network, a list of the presentation instruments in the set is accessed from a computer database, and each of the presentation instruments is activated.

20 Claims, 17 Drawing Sheets

Related U.S. Application Data continuation-in-part of application No. 11/419,413, filed on May 19, 2006, now Pat. No. 7,822,640, which is a continuation-in-part of application No. 10/696,014, filed on Oct. 28, 2003, now Pat. No. 8,370,205, said application No. 11/837,252 is a continuation-in-part of application No. 10/238,044, filed on Sep. 9, 2002, now abandoned, which is a continuation-in-part of application No. 10/167,720, filed on Jun. 10, 2002, now abandoned.

(51) Int. Cl.
G06Q 40/00 (2012.01)
G06K 19/00 (2006.01)

(58) Field of Classification Search
USPC .................. 235/379, 380; 705/35, 40, 44
See application file for complete search history.

(56) References Cited

U.S. PATENT DOCUMENTS

| | | | |
|---|---|---|---|
| 5,220,501 A | 6/1993 | Lawlor et al. | |
| 5,256,863 A | 10/1993 | Ferguson et al. | |
| 5,555,496 A | 9/1996 | Tackbary et al. | |
| 5,696,908 A | 12/1997 | Muehlberger et al. | |
| 5,699,528 A | 12/1997 | Hogan | |
| 5,757,917 A | 5/1998 | Rose et al. | |
| 5,774,879 A | 6/1998 | Custy et al. | |
| 5,777,305 A | 7/1998 | Smith et al. | |
| 5,826,241 A | 10/1998 | Stein et al. | |
| 5,832,458 A | 11/1998 | Jones | |
| 5,899,980 A | 5/1999 | Wilf et al. | |
| 5,905,246 A | 5/1999 | Fajkowski et al. | |
| 5,918,909 A * | 7/1999 | Fiala .................... | B42D 15/00 283/61 |
| 5,923,016 A | 7/1999 | Fredregill et al. | |
| 5,960,412 A | 9/1999 | Tackbary et al. | |
| 5,987,140 A | 11/1999 | Rowney et al. | |
| 5,987,429 A | 11/1999 | Maritzen et al. | |
| 5,991,750 A | 11/1999 | Watson | |
| 5,999,625 A | 12/1999 | Bellare et al. | |
| 6,000,608 A | 12/1999 | Dorf | |
| 6,012,045 A | 1/2000 | Barzilai et al. | |
| 6,012,048 A | 1/2000 | Gustin et al. | |
| 6,032,133 A | 2/2000 | Hilt et al. | |
| 6,044,363 A | 3/2000 | Mori et al. | |
| 6,058,379 A | 5/2000 | Odom et al. | |
| 6,058,417 A | 5/2000 | Hess et al. | |
| 6,070,798 A | 6/2000 | Nethery | |
| 6,073,117 A | 6/2000 | Oyanagi et al. | |
| 6,088,684 A | 7/2000 | Custy et al. | |
| 6,098,053 A | 8/2000 | Slater | |
| 6,119,106 A | 9/2000 | Mersky et al. | |
| 6,122,625 A | 9/2000 | Rosen | |
| 6,167,386 A | 12/2000 | Brown | |
| 6,175,823 B1 | 1/2001 | Van Dusen | |
| 6,226,623 B1 | 5/2001 | Schein et al. | |
| 6,246,996 B1 | 6/2001 | Stein et al. | |
| 6,308,887 B1 | 10/2001 | Korman et al. | |
| 6,336,099 B1 | 1/2002 | Barnett et al. | |
| 6,473,500 B1 * | 10/2002 | Risafi .................... | G07F 7/1008 235/379 |
| 6,476,500 B2 * | 11/2002 | Kimura .................... | H01L 24/06 257/686 |
| 6,535,229 B1 * | 3/2003 | Kraft .................... | G06F 3/0481 715/764 |
| 6,612,487 B2 | 9/2003 | Tidball et al. | |
| 6,847,935 B1 | 1/2005 | Solomon et al. | |
| 6,957,737 B1 | 10/2005 | Frederickson et al. | |
| 7,006,983 B1 | 2/2006 | Packes et al. | |
| 7,024,807 B2 * | 4/2006 | Street .................... | B42D 15/045 283/101 |
| 7,028,896 B2 * | 4/2006 | Goldstein .................... | 235/436 |
| 7,578,439 B2 | 8/2009 | Graves et al. | |
| 7,614,548 B2 | 11/2009 | Schultz et al. | |
| 7,841,520 B2 | 11/2010 | Schultz et al. | |
| 8,256,682 B2 | 9/2012 | Chakiris et al. | |
| 2001/0018660 A1 | 8/2001 | Sehr | |
| 2001/0047342 A1 | 11/2001 | Cuervo | |
| 2002/0049669 A1 | 4/2002 | Bleser et al. | |
| 2002/0152116 A1 | 10/2002 | Yan et al. | |
| 2002/0161641 A1 | 10/2002 | Quinlan et al. | |
| 2002/0165795 A1 | 11/2002 | Holley et al. | |
| 2003/0001005 A1 | 1/2003 | Risafi et al. | |
| 2003/0024981 A1 | 2/2003 | Narasimhan | |
| 2003/0053609 A1 | 3/2003 | Risafi et al. | |
| 2003/0097331 A1 | 5/2003 | Cohen | |
| 2003/0115126 A1 | 6/2003 | Pitroda | |
| 2003/0150142 A1 | 8/2003 | Street | |
| 2003/0154163 A1 | 8/2003 | Phillips et al. | |
| 2005/0033639 A1 | 2/2005 | Myers | |
| 2005/0091115 A1 | 4/2005 | Arthur | |
| 2006/0261154 A1 | 11/2006 | Arthur et al. | |
| 2007/0278296 A1 * | 12/2007 | Dwyre .................... | G06Q 40/00 235/380 |

FOREIGN PATENT DOCUMENTS

| | | |
|---|---|---|
| EP | 1077436 A2 | 2/2001 |
| WO | 00/22559 A1 | 4/2000 |
| WO | WO 0022494 A2 * | 4/2000 |
| WO | 00/34899 | 6/2000 |
| WO | 00/54122 A2 | 9/2000 |
| WO | 00/67177 | 11/2000 |
| WO | 00/79452 | 12/2000 |
| WO | 01/04816 | 1/2001 |
| WO | 01/41419 | 6/2001 |
| WO | 2005/045601 A2 | 5/2005 |

OTHER PUBLICATIONS

Author Unknown, "DotBank You've Got Money," Arthas Corp., 1999, 7 pages. Accessed at: http://dotbank.com.

Author Unknown, "Transpoint Common Questions," TransPoint, 2000, 12 pages. Accessed at: http://www.transpoint.com/service . . . .

Confinity, Inc., PayPal.com, How PayPal.com Works, download from website http://www.paypal.com on Feb. 7, 2000, 7 pages.

Dotbank. "The Way to Send and Receive Money on the Internet," download from website http://www.dotbank.com, Feb. 7, 2000, 6 pages.

Francella, Barbara Grondin, Prepared for prepaid: retailers look to new technologies for handling exploding Nov. 19, 2001, Convenience Store News, v 37, n 14, p. 31(4).

Idealab Company, "PayMe.com," download from website http://ssl.idealab.com on Feb. 16, 2000, 7 pages.

Intell-A-Check Corp.: "Intell-A-Check!—The Way to get Paid", Intell-A-Check product overview, retrieved from http://www.icheck.com/ on 0210712000, 7 pages.

PCT International Search Report and Written Opinion mailed Jan. 27, 2009, International Application No. PCT/US2008/072638, 11 pages.

Supplementary European Search Report dated Aug. 29, 2011 for EP Application No. 04785344.5 filed Jan. 1, 2004, 2 pages.

TeleCheck International, Inc.: "Making Checks Our Responsibility", retrieved from http://www.telecheck.com/home/home.html on Feb. 7, 2000, 8 pages.

Telecheck, Verification Services, Internet, http://telecheck.com, Feb. 7, 2000.

Transpoint, "The Way to Pay Online", downloaded from website http://www.transpoint.com on Feb. 10, 2000, 12 pages.

Woo, S., et al., "Rebate Quests Often Result in Unhappy Returns", The Denver Post, Apr. 1, 2002, 2 pages.

* cited by examiner

METHODS AND SYSTEMS FOR BULK ACTIVATION OF MULTIPLE, DISPARATE STORED VALUE ACCOUNTS

CROSS-REFERENCES TO RELATED APPLICATIONS

This application is a continuation and claims the benefit of U.S. application Ser. No. 11/837,252 of Dwyre et al., filed Aug. 10, 2007 and titled "Methods and Systems for Bulk Activation of Multiple, Disparate Stored Value Accounts", which is a continuation-in-part of U.S. application Ser. No. 11/419,413, of Arthur et al., filed May 19, 2006 and titled "Multi-Card Activation Systems and Methods", which is a continuation-in-part of U.S. application Ser. No. 10/696,014, of Arthur, filed Oct. 28, 2003 and titled "System for Activation of Multiple Cards", the complete disclosures of which are herein incorporated by reference. U.S. application Ser. No. 11/837,252 is also a continuation-in-part and claims the benefit of U.S. application Ser. No. 10/238,044, of Algiene, filed Sep. 9, 2002 and titled "Rebate Issuance and Reconciliation Systems and Methods", which is a continuation-in-part of U.S. application Ser. No. 10/167,720, of Algiene, filed Jun. 10, 2002, titled "Rebate Issuance System and Methods", the complete disclosures of which are herein incorporated by reference.

BACKGROUND OF THE INVENTION

Some embodiments of this invention relate generally to cards or other presentation instruments for purchasing items, such as at point-of-sale devices. In particular, some embodiments of the invention relate to gift cards. In one particular embodiment, the invention relates to purchasing an activating multiple presentation instruments at the same time, e.g. with a single activation transaction. Presentation instruments may sometimes be called presentation devices, or payment devices.

One convenience item that is commonly purchased at point-of-sale devices is the gift card. Gift cards are often displayed at points-of-sale such as at supermarket checkout stands or restaurant cashier stands. In the typical setting, a consumer will purchase one or two gift cards at a time. These gift cards are often activated by swiping them, scanning them, or otherwise acquiring data necessary for a successful activation at the checkout stand at which point the card number is referred to a processing system which activates the card's account.

However, there are some purchasers who desire to purchase a large quantity of gift cards at a single time. For example, a corporate entity may desire to purchase a large number of cards as rewards for its employees. Similarly, a consumer may desire to purchase and activate a large number of gift cards all at once and sell them at a discount to others. Thus, there is a portion of the consuming public that actually purchases a large number of cards at a single checkout.

As a result of this, it can severely delay the checkout process if the cashier is required to swipe, scan, or otherwise acquire data necessary for a successful activation of all of the cards being purchased. For example, a cashier may have to swipe 100 individual cards which are then activated and confirmed. The resulting delay can severely hamper the progression of consumers through the checkout lines at a store.

Similarly, there is a need for a packaging system that allows a purchaser to conveniently purchase a bulk amount of cards without the necessity of physically counting the individual cards. Again, since these cards are often purchased at the checkout lane, a delay can be incurred if the consumer is required to count out the number of cards that he or she desires to purchase.

As a result, there is a need for a more efficient mechanism for purchasing and activating a large number of cards or other presentation instruments.

BRIEF SUMMARY OF THE INVENTION

According to one embodiment of the invention, a method of activating a plurality of presentation instruments, such as gift cards, at a point-of-sale device is realized by providing a first card number corresponding to a first card in the series of cards; providing a total number of cards to be activated; activating the card corresponding to the first card number; and activating the next successive card in the series corresponding to the next successive card number.

According to another embodiment of the invention, the method of activating more than one gift card at a point-of-sale device is provided by receiving a plurality of cards at a point-of-sale device; entering a first indicator indicative of a first card in the plurality of cards; entering a total number of cards in the plurality of cards; indicating the first indicator and the total number of cards to an activation computer; receiving confirmation that the plurality of cards have been approved for activation.

According to yet another embodiment of the invention, a method of validating the activation of a plurality of cards is provided by receiving from a point-of-sale device an indicator indicative of a first card in the plurality of cards; receiving an indicator indicative of a total number of cards in the plurality of cards; determining whether the plurality of cards can be activated; and indicating a validation signal so as to indicate at the point-of-sale device whether the plurality of cards can be activated.

According to one embodiment of the invention, a packaging system is provided by providing a plurality of cards having sequential card numbers; packaging the plurality of cards in the common package; configuring at least one card number for detection by a bar code scanner or other kind of point-of-sale acquisition device; and labeling the package with the total number of cards in the package.

Similarly, another method of packaging cards according to one embodiment of the invention is provided by supplying as a package a plurality of cards, each of the cards having a different respective card number; wherein the card numbers form a sequential order; and providing a package identifier on the package wherein the package identifier comprises an indicator indicating one of the plurality of cards and an indicator indicating the total number of cards in the package for activation.

According to another embodiment of the invention, a method of activating a plurality of gift cards utilizes a package of multiple presentation instruments. Each presentation instrument includes a unique presentation instrument identifier used to associate value with the presentation instrument. Also, the package includes a package identifier. In one step, the package identifier is read from the package and is transmitted over an electronic network to a host computer system which evaluates the package identifier to determine whether the package identifier is valid. If so, each of the presentation instruments in the package is activated for a certain activation amount.

Conveniently, the package identifier may be read electronically at a point of sale device using a reader. Such readers may include a bar code reader, a magnetic stripe reader, an RF reader and the like. Such readers may also be used to read the presentation instrument identifiers and then transmit the identifiers to the host computer system.

In one aspect, the host computer system may be associated with a database that includes package identifiers and presentation instrument identifiers that are associated with the package identifiers. In this way, the presentation instruments may be activated by flagging those presentation instrument identifiers that are associated with the package identifier that was read from the package. In another aspect, a purchase amount for the package may be transmitted to the host computer system which evaluates the purchase amount and validates the activation if it is the correct amount. In some cases, at least some of the presentation instruments may be activated for different activation amounts.

Once activated, the presentation instruments may be separated from the package and used to make purchases, also referred to redemption transactions. For example, one of the presentation instrument identifiers may be read with a point of sale device when performing a redemption transaction. The presentation instrument identifier may be transmitted to the host computer system along with a requested redemption amount, or other data signifying a redemption of stored value (dollars, points, services, etc.). The activation amount may then be reduced by the redemption amount and a confirmation of the transaction transmitted back to the point of sale device.

In a further embodiment, the invention provides a presentation instrument package arrangement that comprises a plurality of presentation instruments that each have an account identifier stored thereon. The account identifiers are associated with stored value accounts maintained on a host computer system. The package arrangement further includes packaging material used to secure the presentation instruments together. Also, a package identifier is associated with the packaging material and is readable by a point of sale device to activate each of the presentation instruments at the host computer system.

In one aspect, the presentation instruments comprise plastic cards, and the account identifiers may be stored on media such as bar codes, magnetic stripes, RF chips and the like. In other embodiments, the presentation instruments may be electronic in nature and capable for storing multiple, virtual account identifiers. In another aspect, the packaging material may be a material such as shrink wrap, card board, paper, and the like. Also, the package identifier may be stored on media such as bar codes, RF chips and the like.

In one particular embodiment, the invention provides a system for activating of a plurality of presentation instruments. The system includes a host computer system having a record of a group of account identifiers, activation amounts for each of the account identifiers and a group identifier that is associated with the group of account identifiers. The system also includes a package arrangement comprising a plurality of presentation instruments that each have a presentation instrument identifier stored thereon, packaging material used to secure the presentation instruments together, and a package identifier associated with the packaging material. The host computer system is configured to receive the package identifier from a point of sale device, to compare the package identifier with the group identifier and to activate each of the presentation instruments that are associated with the group identifier.

In some cases, the account identifier and the associated presentation instrument identifiers may be the same or different. Also, activation amounts may be associated with each of the account identifiers. In this way, the host computer system may receive a purchase amount for the package arrangement and to activate the associated presentation instruments if the activation amount equals the purchase amount for all of the account identifiers associated with the package. In some cases, at least some of the activation amounts are different from each other. As such a package may be sold with presentation instruments of different value.

The system may further include at least one point of sale device that is configured to read the package identifier and to transmit the package identifier to the host computer system. The point of sale device may include a reader such as a bar code reader, a magnetic stripe reader, an RF reader or the like. In other embodiments, the presentation instruments may be activated at a manufacturer site, processor site, or other location different from a merchant point of sale.

As another feature, the point of sale device may be used to read the presentation instrument identifier from the presentation instrument and to transmit the presentation instrument identifier to the host computer system In this way, funds or other value may be debited from the account when making purchases or added to the account when performing a reload transaction or some other type of positive credit activity, such as a store return, store credit, loyalty credit, or other kind of positive credit activity.

In some embodiments, a set of presentation instruments to be activated comprises at least first and second presentation instruments redeemable at different merchants. A set identifier is received, identifying the set of presentation instruments. A list of the presentation instruments is accessed, based on the set identifier, from a computer database and each of the presentation instruments is activated. In some embodiments, the set identifier is received by a host computer system that activates all of the presentation instruments in the set. In some embodiments, the set identifier is received by a host computer system that activates fewer than all of the presentation instruments in the set and sends a message to another processing system identifying at least one presentation instrument not activated at the host computer system, and the presentation instrument not activated by the host computer system is activated by the other computer system. In some embodiments, the set identifier is received by an aggregating computer system, which sends messages to multiple host computer systems, each of which activates at least one presentation instrument from the set. Each of the presentation instruments may be a gift card, an admission ticket such as to a concert, sporting event, theater, ski lift, amusement park, or other venue, or may be another kind of presentation instrument. The set of presentation instruments may be secured together by a package comprising the set identifier. The presentation instruments may be purchased by a consumer at a point of sale, or acquired by the consumer over a computer network, or acquired in a different way. The presentation instruments may be physical objects or may be represented electronically.

In another embodiment, a presentation instrument package comprises a set of presentation instruments that includes at least first and second presentation instruments redeemable at different merchants, a package securing the presentation instruments together, and a set identifier that uniquely identifies the set and is readable from the package. The presentation instruments may include one or more gift cards, admission tickets, or any of these or other kinds of presentation instruments in any combination. In some embodiments, the presentation instruments in the set are selected to conform with a theme.

In another embodiment, a method of producing a presentation instrument package comprises selecting a set of presentation instruments that includes at least first and second presentation instruments redeemable at different merchants, storing a unique account identifier on each presentation instrument, securing the presentation instruments together with a package that includes a set identifier that uniquely identifies the set of presentation instruments, and associating the unique account identifiers with the set identifier in a computer database. The computer database may be stored on a host computer, an aggregating computer, or on some other system capable of storing and maintaining the database.

In another embodiment, a system for activating a set of disparate stored value presentation instruments comprises a host computer system that stores a database. The database associates a set identifier with a plurality of unique account identifiers, the set identifier identifying a set of at least two presentation instruments redeemable at different merchants, each account identifier used to associate funds or other stored value with one of the presentation instruments. The host computer system receives, over an electronic network, the set identifier and a request to activate the presentation instruments in the set. The host computer system activates at least one of the presentation instruments. In some embodiments, the host computer system activates all of the presentation instruments in the set. In some embodiments, the host computer system activates fewer than all of the presentation instruments in the set, and may send a message to another computer system identifying at least one presentation instrument not activated by the host computer system. The other computer system may activate one or more presentation instruments not activated by the host computer system. In some embodiments, the set identifier is read from a package that secures the presentation instruments together. The presentation instruments may include stored value cards or other kinds of presentation instruments, and may be represented electronically.

In another embodiment, a system for activating a set of disparate stored value presentation instruments comprises an aggregating computer system that holds a database associating a set identifier with a plurality of unique account identifiers. The set identifier identifies a set of at least two presentation instruments redeemable at different merchants, and each unique account identifier is used to associate funds or other stored value with one of the presentation instruments. The system also comprises an electronic network over which the aggregating computer system receives the set identifier and a request to activate the presentation instruments in the set, a first host computer that activates a first presentation instrument in the set, and a second host computer that activates a second presentation instrument in the set. The aggregating computer sends messages to the host computers requesting activation of the respective presentation instruments.

In a method according to another embodiment, a set of stored value presentation instruments is offered to a consumer in return for the purchase of a particular product. The set includes presentation instruments redeemable at different merchants. The sale of the particular product is completed, each of the presentation instruments is activated, and the set of presentation instruments is provided to the consumer. The set of presentation instruments may be offered to the consumer by the manufacturer of the particular product, by the merchant making the sale, or by both. At least one of the presentation instruments may be a gift card, and the presentation instruments may be represented electronically. The presentation instruments may be represented electronically on a handheld electronic device, such as a cellular telephone. At least one of the presentation instruments may be redeemable only for a limited period of time.

Further embodiments of the invention will be apparent to those of ordinary skill in the art from a consideration of the following description taken in conjunction with the accompanying drawings, wherein certain methods, apparatuses, and articles of manufacture for practicing the embodiments of the invention are illustrated.

DETAILED DESCRIPTION OF THE INVENTION

Figure 7:
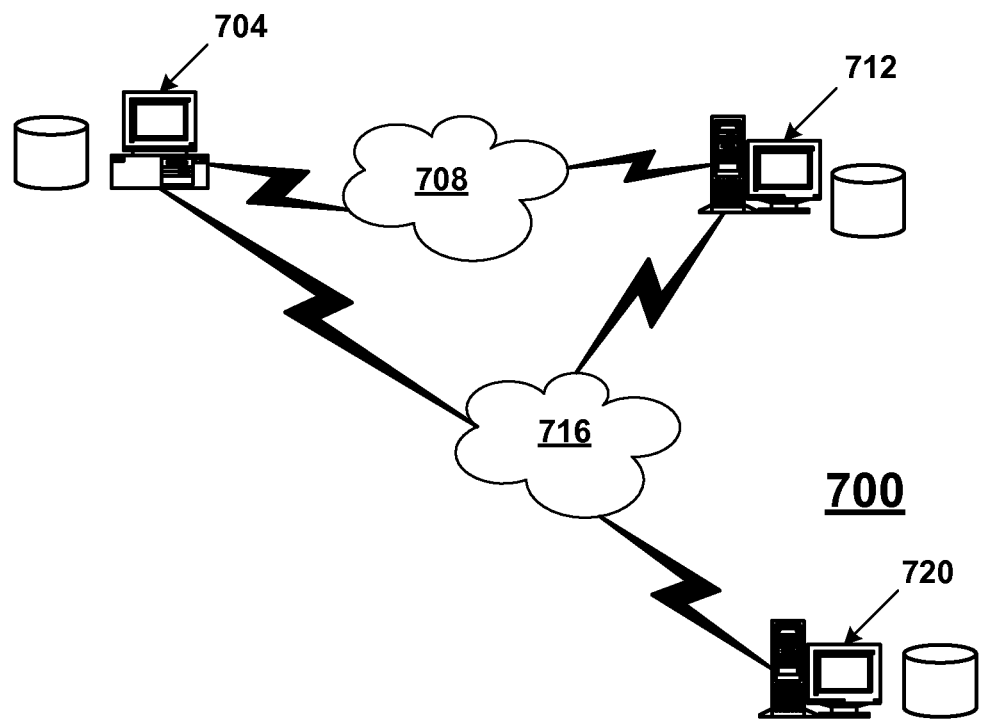
FIG. 7 illustrates a system for activating a plurality of cards according to one embodiment of the invention.

Referring now to FIG. 7, a system for implementing an embodiment of the invention can be seen. FIG. 7 illustrates a system 700 which is comprised of a point-of-sale device 704, a validation computer system 712, and an activation computer database 720. In one sense, validation computer system 712 and activation computer database 720 may be referred to as a host computer system that is used both to activate multiple presentation instruments at the same time, as well as to perform redemption and reload transactions for already purchased presentation instruments. The various systems are coupled by networks 708 and 716 in FIG. 7. However, it should be noted that a variety of coupling systems could be used to interlink the various computer systems for purposes of this embodiment of the invention.

In FIG. 7, point-of-sale device 704 is coupled with a validation computer 712 across network 708. While some examples herein describe activating presentation instruments that are cards, such as gift cards, it will be understood that the systems and methods described may also be employed to validate other kinds of presentation instruments as well. Point-of-sale device 704 may include a reader, such as a bar code reader, magnetic strip reader, an RF or other chip reader and the like. Further, the point of sale device 704 may include a key entry pad, a display screen, a receipt printer and the like as in known in the art. Examples of suitable POS devices are provided in the following commonly assigned applications, the entire disclosures of which are incorporated herein by reference for all purposes: U.S. Prov. Pat. Appl. No. 60/147,889, entitled "Integrated Point Of Sale Device," filed Aug. 9, 1999 by Randy J. Templeton et al.; U.S. patent application Ser. No. 09/634,901, entitled "Point Of Sale Payment System," filed Aug. 9, 2000 by Randy J. Templeton et al.; U.S. patent application Ser. No. 10/116,689, entitled "Systems And Methods For Performing Transactions At A Point-Of-Sale," filed Apr. 3, 2002 by Earney Stoutenburg et al.; U.S. patent application Ser. No. 10/116,733, entitled "Systems And Methods For Deploying A Point-Of-Sale System," filed Apr. 3, 2002 by Earney Stoutenburg et al.; U.S. patent application Ser. No. 10/116,686, entitled "Systems And Methods For Utilizing A Point-Of-Sale System," filed Apr. 3, 2002 by Earney Stoutenburg et al.; and U.S. patent application Ser. No. 10/116,735, entitled "Systems And Methods For Configuring A Point-Of-Sale System," filed Apr. 3, 2002 by Earney Stoutenburg.

The validation computer system 712 is similarly coupled via network 716 with activation computer system 720. In one particular embodiment, upon a consumer presenting a large amount of gift cards, for example, at the point-of-sale device 704, a clerk can scan the first card so that a bar code on the card is detected by a bar code reader or alternatively swipe the first card through a magnetic stripe reader if magnetic stripe encoding is used. Other methods of identifying the cards may also be used. The card identifier indicated by the bar code or magnetic stripe is subsequently transmitted across network 708 to the card validation computer 712. Furthermore, the clerk can enter the total number of cards to be purchased at the point-of-sale device. Then this number can be transmitted across network 708, as well, to the card validation system. The card validation system can then determine whether the card which has been presented will likely be capable of being activated.

The validation computer system 712 performs the function of determining whether the card which has been presented will be activated. Not all cards that are presented will necessarily be capable of being activated. Cards of different type may inadvertently be presented to the cashier for activation where the consumer mistakenly believes they are all of the same type. The validation system is capable of determining whether the cards that have been presented are all of the same type and amount. Similarly, some cards may have already been activated by prior aborted purchases or other means. Therefore, the card validation computer is capable of detecting whether an error would occur for an already activated card. Thus, the validation computer system 712 operates as a first check to determine whether the cards can all be activated. The actual activation process is a more time-intensive process. Since a significant number of cards can be involved, it is preferred to validate the activation of the cards rather than waiting for all the cards to be activated before signaling back to the point-of-sale device. Nevertheless, in some instances, it may be useful to eliminate the validation act and perform an actual activation before responding to the point of sale (POS).

The activation computer system 720 provides the actual activation of a card number or other presentation instrument identifier. Such a card number or identifier may appear on a plastic card. Thus, the activation process refers to activating an account referred to by the card number as opposed to activating an actual card itself, e.g., a smart card. Any type of card can be used to provide the card number at the point-of-sale device, e.g., plastic card with bar code, magnetic stripe card, card with numbers written on the card, smartcard, etc. It merely represents the account from which purchase amounts are decremented.

While the validation computer 712 and activation computer system 720 have been described as different computers, alternatively they could be performed by the same computer system. Similarly, network 708 and 716 could be the same network.

Figure 2:
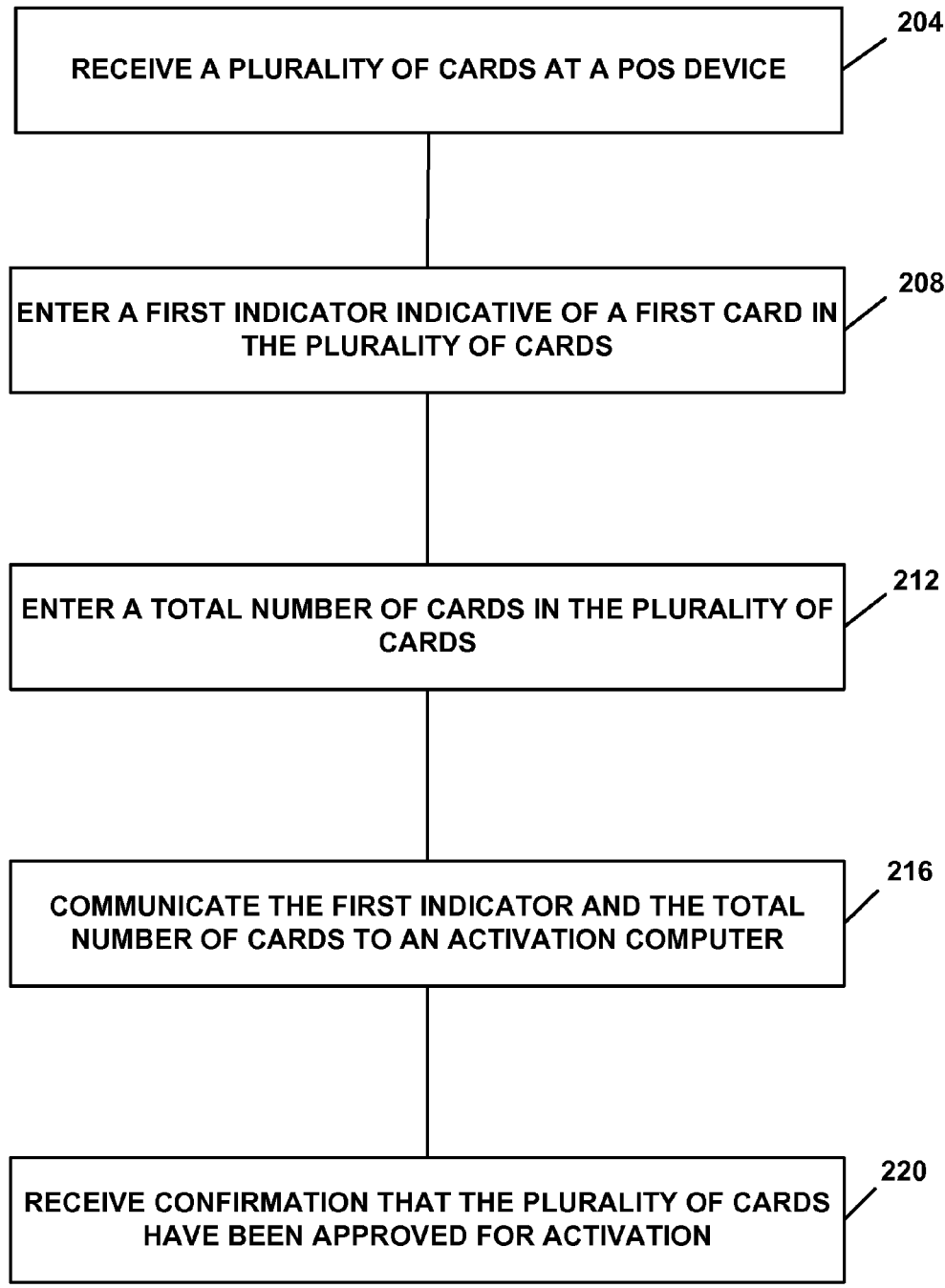
FIG. 2 illustrates a flowchart demonstrating a method for approving activation of a plurality of cards according to one embodiment of the invention.

Referring now to FIG. 2, a method according to one embodiment of the invention will be described. FIG. 2 illustrates a flowchart 200 demonstrating a method for implementing a purchase of a large number of presentation instruments, for example, gift cards at a point-of-sale device. In method 200, a consumer presents a plurality of cards at a point-of-sale device. The plurality of cards are received by the clerk in block 204. The clerk can then enter the indicator for the first card which is one of the cards in the pack of cards presented by the consumer. Thus, a first indicator indicative of a first card in the plurality of cards is entered in block 208. The clerk can enter the first card number by swiping the card through the magnetic stripe reader, keying in the card number into the point-of-sale device, scanning a bar code from the card, or other similar means. In block 212, the total number of cards is entered. Again, the clerk can hand key in the total number of cards that are presented. Alternatively, the point-of-sale device can request a confirmation of the last number in the pack of cards. Thus the clerk can either swipe or hand key in the number of the last card that makes up the pack of cards. In this way, a check can be performed that the entered total number of cards is actually correct. This can be accomplished by simple calculation using the first card number and the last card number.

In block 216, the first indicator, which has the card number of the first card, and the total number of cards in the pack of cards are communicated to an activation computer. This can be a direct communication or performed through the validation system, depending on the configuration of the system. In block 220, a confirmation is transmitted confirming whether the plurality of cards have been approved for activation.

Once a consumer presents a group of cards, there may be a change of heart in the purchase decision. At that point, the user can indicate the decision not to purchase the cards to the clerk and the clerk can void the transaction. When a void signal is transmitted, the activation process can either be aborted or, for a completed activation process, voided. A batch number can be used with the information sent from the point-of-sale device to initiate the activation of the cards. Thus, this same batch number can be used by the point-of-sale device to indicate the void of the purchase without having to enter every card number. The batch number serves as a reference number that voids the activation of the associated cards. Consequently, a computer system such as the computer system shown in FIG. 7 can utilize the batch number to initiate and void the activation of the cards by associating the batch number with the data and acts performed in the validation and activation processes. Alternatively, the batch number can originate at the host where it is assigned to a particular purchase of multiple cards. Still, it could be used as described above to void a purchase or to track a set of cards.

Figure 3:
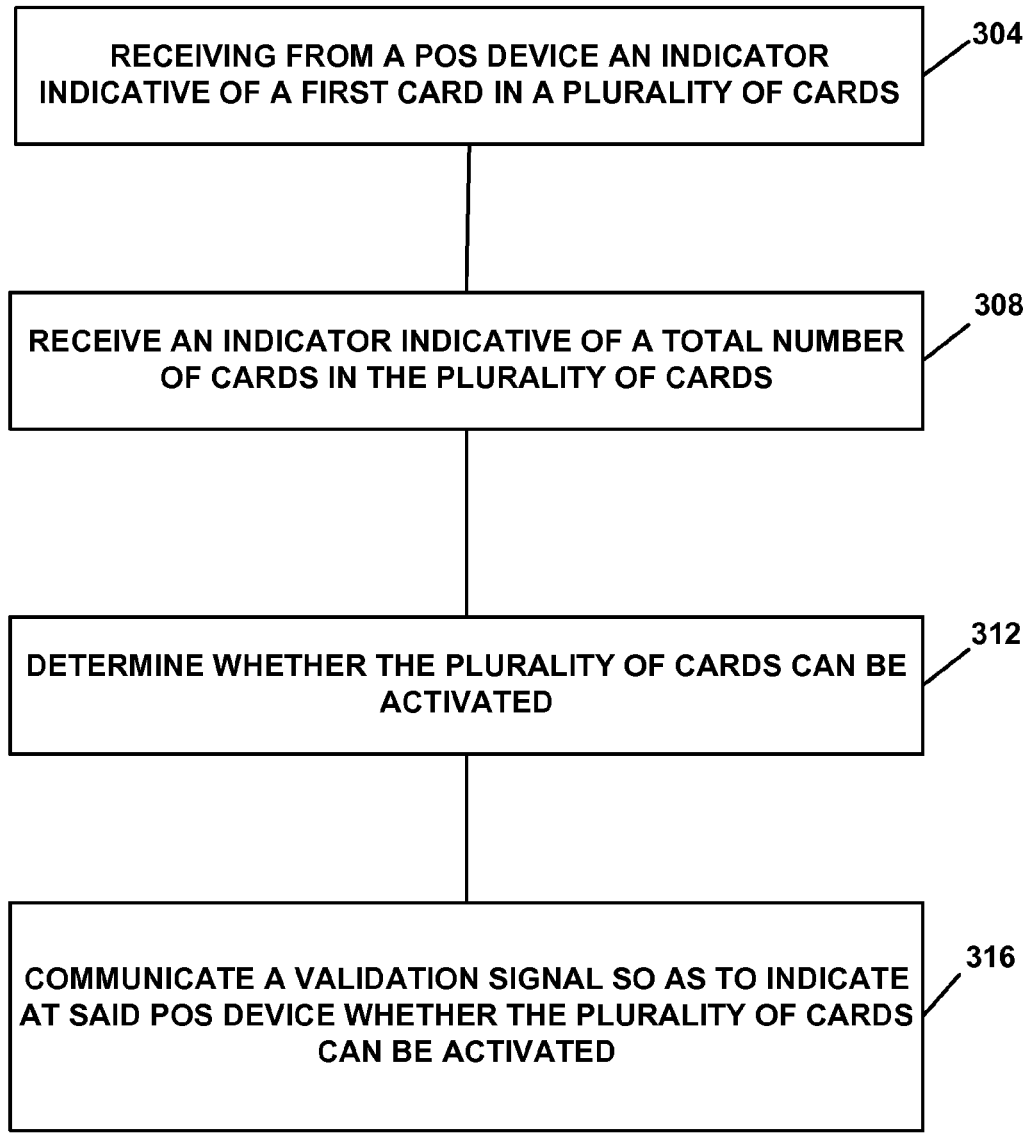
FIG. 3 illustrates a flowchart demonstrating a method of validating activation of a plurality of cards according to one embodiment of the invention.

FIG. 3 illustrates an example of the validation process. Namely, flowchart 300 illustrates a method according to one embodiment for validating whether a plurality of cards or other presentation instruments can be activated. In block 304, a signal is received at the validation computer from a point-of-sale device comprising an indicator which is indicative of a first card in the pack of multiple cards. In block 308, a second indicator is received which is indicative of the total number of cards in the pack of cards. This second indicator can be coupled with the indicator for the first card so that a single signal is sent to the validation computer. In block 312, a determination is made as to whether the pack (or group) of cards can be activated. Furthermore, in block 316, the result of the validation determination can be communicated by a validation signal so as to indicate at the point-of-sale device whether the plurality of cards in the pack of cards can be activated.

To determine whether the plurality of cards can be activated, a check can be made of the card numbers to confirm that all card numbers are of the same card type and card amount, for example. Thus, if a user presents a group of cards that are for different stores, such as Walmart and Starbucks, the validation procedure can note that the cards are of different types and optionally abort the activation. Similarly, if the first card is for $50 and some of the remaining cards are for $100, the validation process can determine that there is an error and optionally abort the activation of all the cards. Similarly, if a card has previously been activated, the validation process can note that fact and choose whether to activate the remaining cards. One possibility is to abort the entire activation process. However, another possibility is to skip that card and continue activating the remaining cards.

Figure 1:
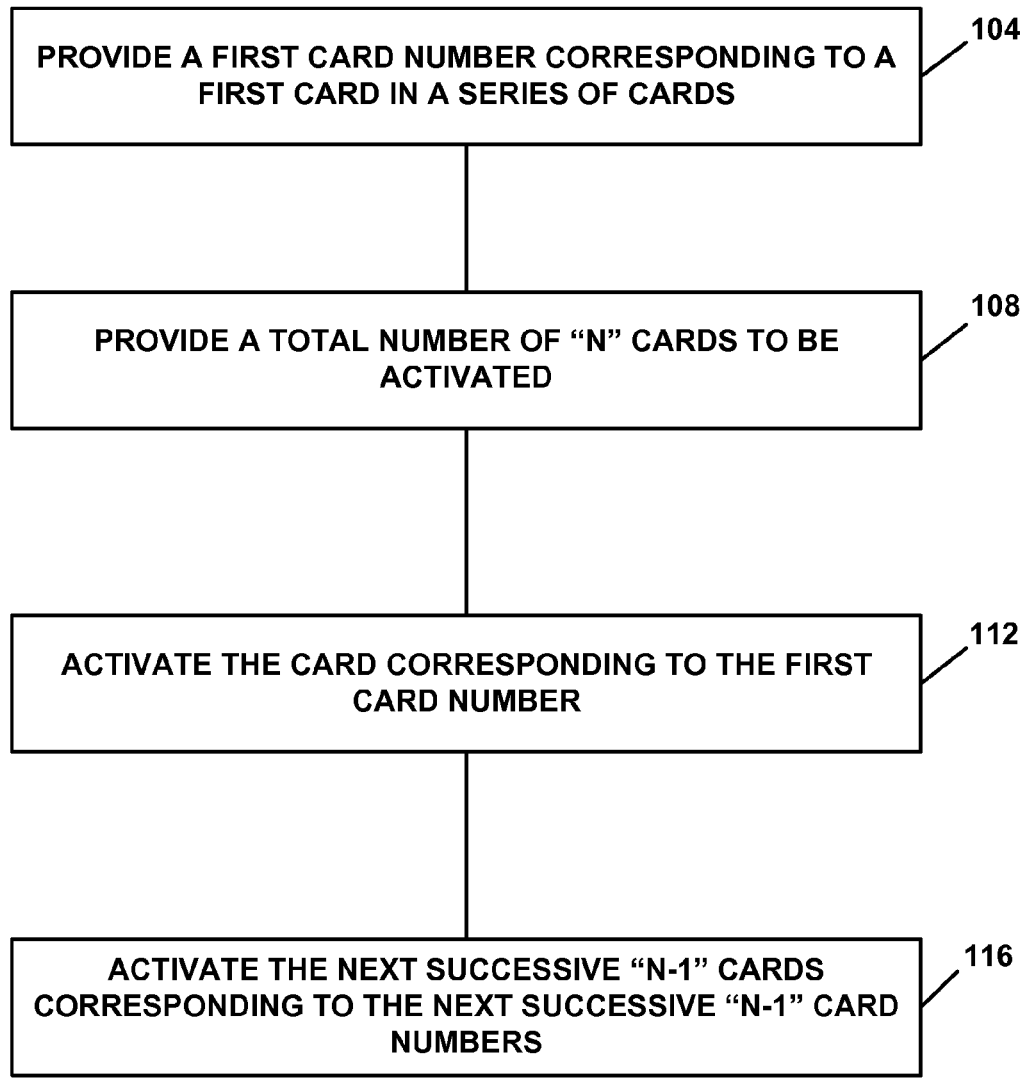
FIG. 1 illustrates a flowchart for implementing a method for activating a plurality of cards according to one embodiment of the invention.

FIG. 1 illustrates a flowchart 100 for implementing a method of activating a pack of cards, according to one embodiment of the invention. In block 104, a first card number corresponding to the first card in the series of cards is provided. Similarly, in block 108, the total number of cards to be activated is provided and illustrated by "N". In block 112, the first card number corresponding to the first card is activated by the activation system.

Furthermore, in block 116, the next successive "N−1" cards corresponding to the next successive "N−1" card numbers are activated.

Again, it should be understood that card activation refers to activating the ability of the card to be used in a purchase. It does not require that the card be a device that can be activated, such as a smart card. For example, the card could merely be a plastic card with a number written on the card, a magnetic stripe card, a card encoded with a bar code, or any device capable of storing the referenced number. The corresponding account would then be activated to allow purchases to be attributed to the account when the card is presented at the time of purchase. Furthermore, a card number is intended to mean the indicator associated with a particular card or other payment device. Obviously, such an indicator could be comprised of letters or other indications. Preferably, the card number is a numerical indicator or alphabetical indicator so that successive cards can be easily identified. Of course, a card number might be indicated by bar code, magnetic stripe or the like for easy detection by automated card reading devices.

Figure 4A:
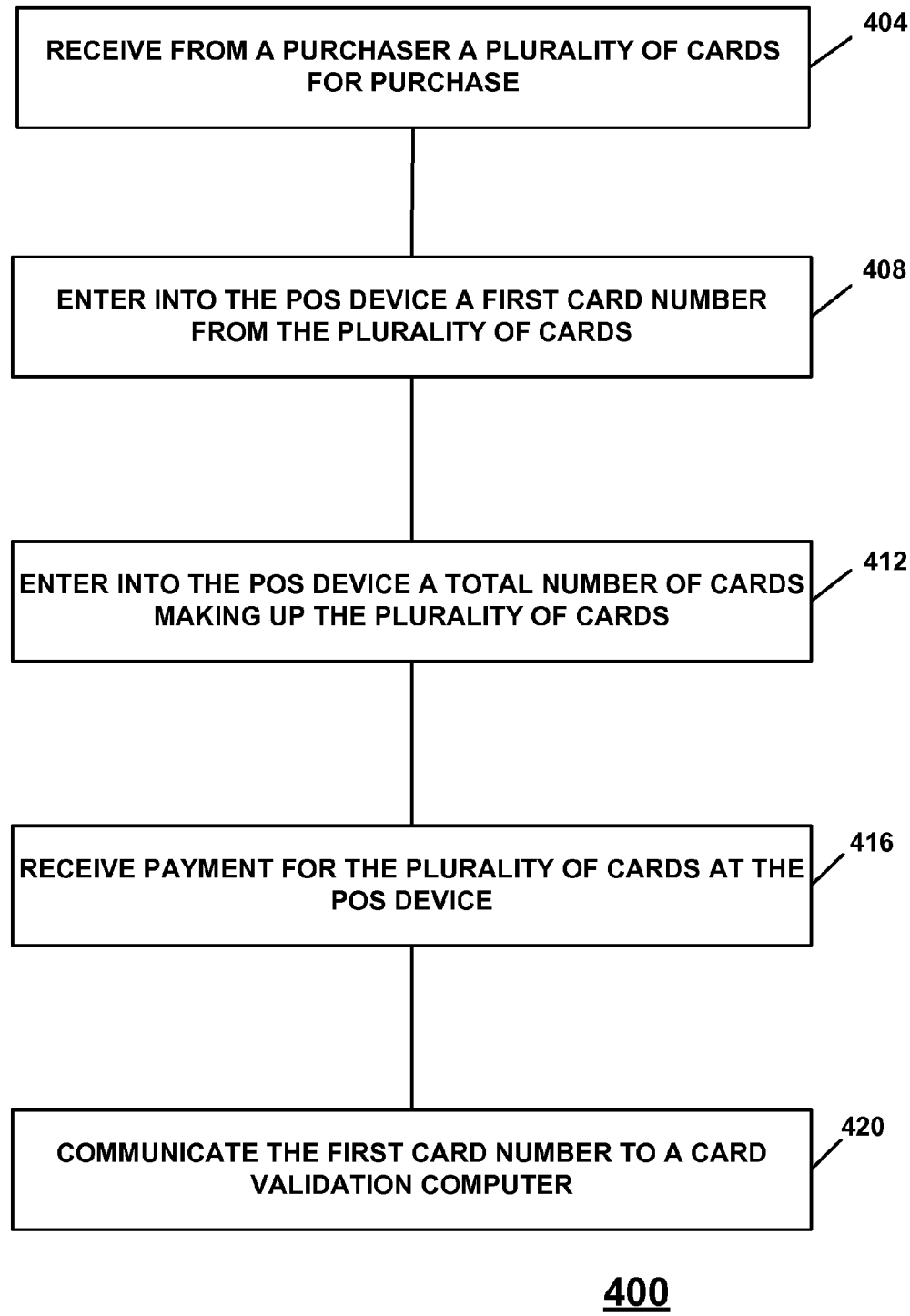
FIGS. 4A, 4B, and 4C illustrate a flowchart 400 for implementing a method for activating a plurality of cards according to one embodiment of the invention.
Figure 4B:
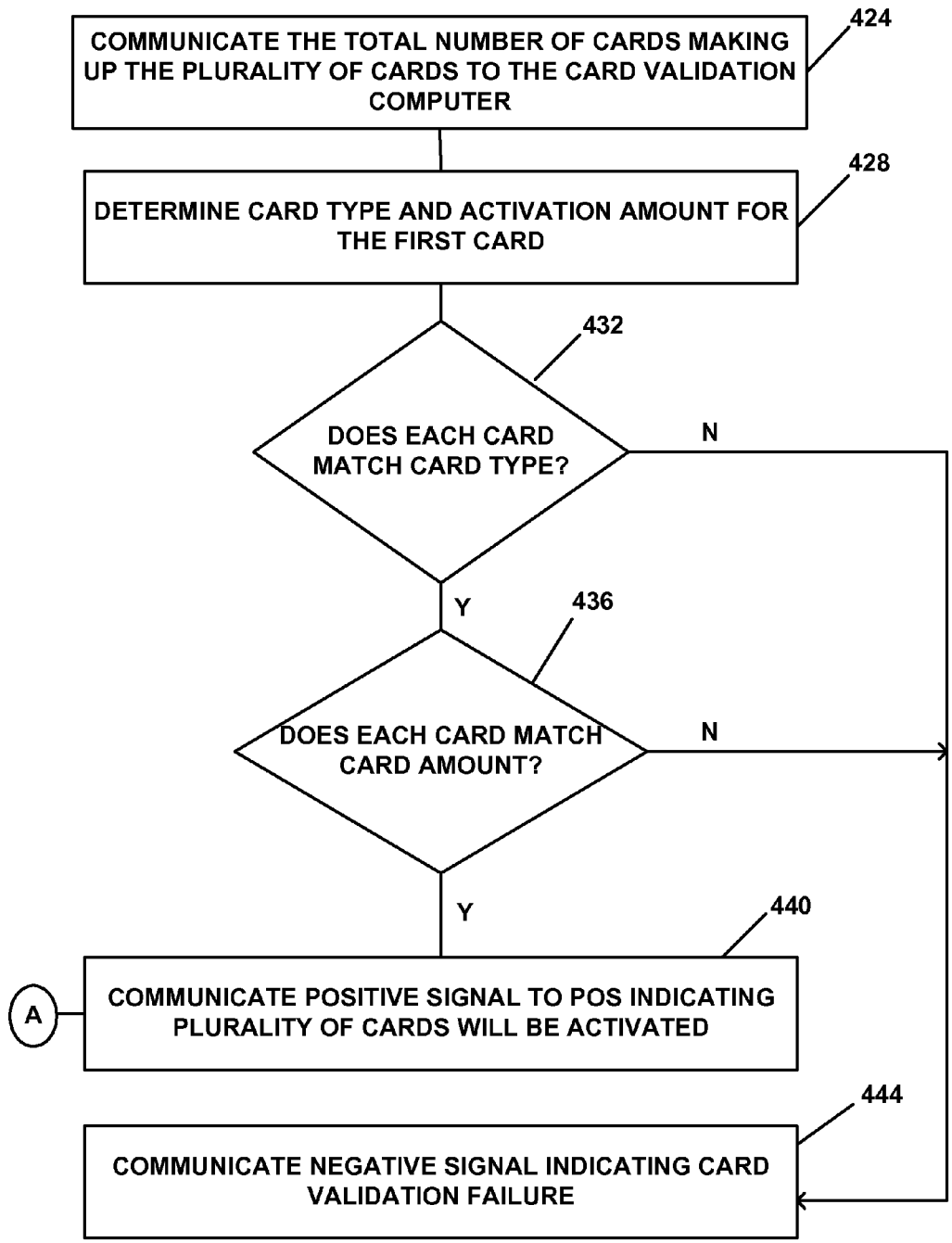
Figure 4C:
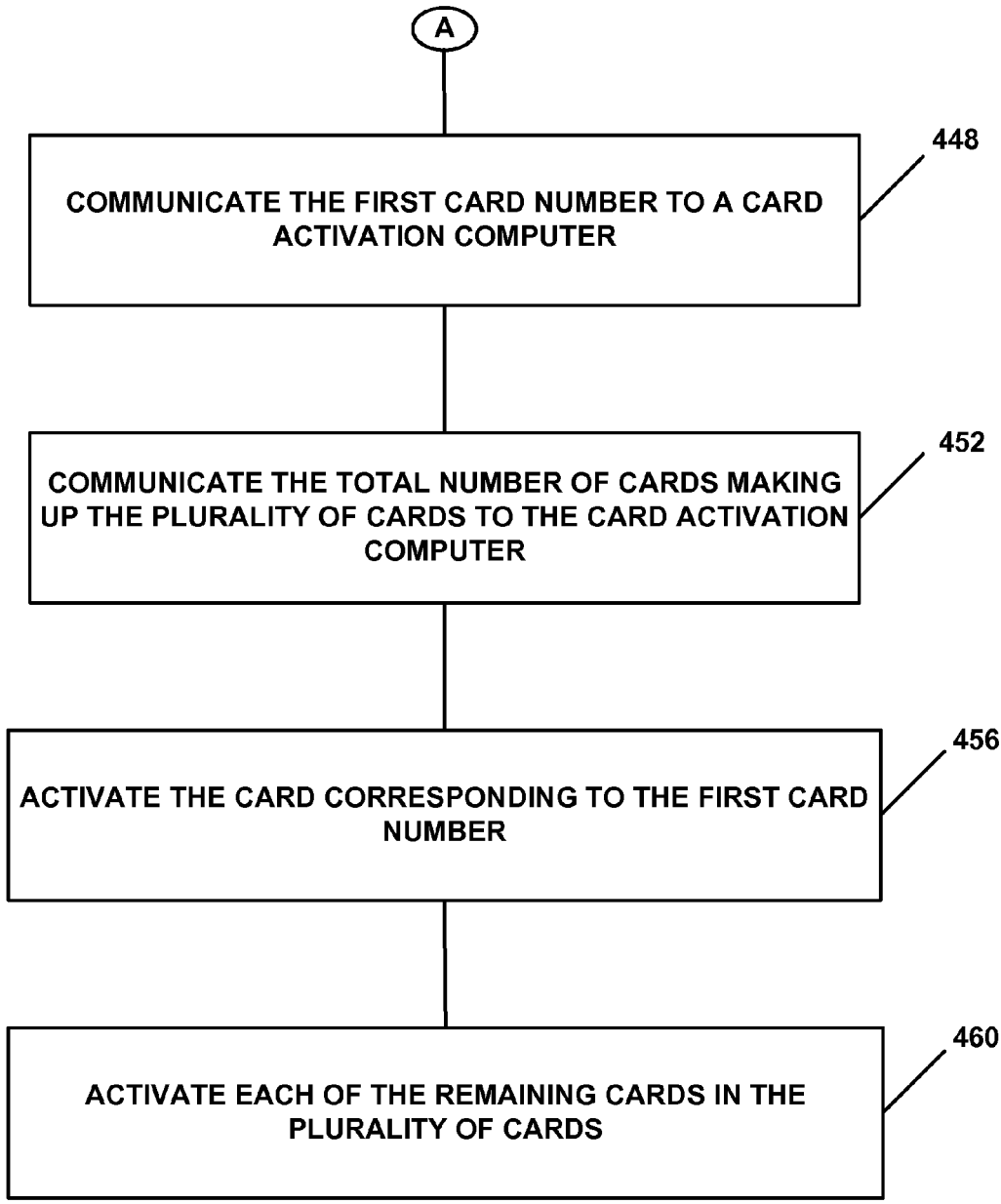

Referring now to FIGS. 4A, 4B, and 4C, a flowchart 400 illustrating a method according to one embodiment of the invention for activating a plurality of cards or other presentation instruments can be seen. Again, in block 404, a clerk receives from a purchaser a plurality of cards for purchase at a point-of-sale device. The clerk enters into the point-of-sale device the first card number from the plurality of cards as shown in block 408. The clerk can enter the first card number by swiping a first card across a magnetic stripe reader, scanning a bar code on the card, hand keying in the first card number, or using another automated means of entering this number. Furthermore, the clerk can enter into the point-of-sale device a total number of cards that make up the pack for the plurality of cards as shown in block 412. After completing the data entry of the pack of cards and any accompanying items, the clerk can request payment and process payment, as shown in block 416. In FIG. 4A, the point-of-sale device communicates the first card number to a card validation computer, as shown in block 420. Furthermore, in this example the point-of-sale device indicates the total number of cards making up the pack of cards to the validation computer as shown in block 424. The validation computer, according to this example, determines the card type and activation amount for the first card as shown in block 428. In decision block 432, the remaining cards in the pack of cards are tested against the card type. For each card, a determination is made as to whether the card type of that card matches the card type of the first card. Thus, for example, a determination can be made as to whether all the cards are for Walmart gift cards. If the card types do not match, the validation computer may optionally communicate a negative signal to the point-of-sale device indicating card validation failure which represents the fact that not all the cards can be activated, as shown in block 444. If such a signal is sent to the point-of-sale device, the clerk can refund the money of the purchaser or retry with a different pack of cards. Similarly, in decision block 436, a second test can be performed to test whether each card matches the card amount of the first card. Again, some cards may be for $50 whereas other cards may be for $100. Therefore, this test confirms that all cards are for the same amount and the purchaser similarly paid the correct amount. Again, if the determination is negative, then a negative signal indicating card validation failure may optionally be sent to the point-of-sale device as mentioned earlier. However, if all cards do satisfy the test criteria, then in block 440, a positive signal can be communicated to the point-of-sale device indicating that the pack of cards will be activated by the activation process. In block 448, the validation computer, according to this example, communicates the first card number to the activation computer. Similarly, in block 452, the validation computer communicates the total number of cards making up the plurality of cards to the activation computer. In block 456, the activation system initiates a batch process for activating each individual card by activating the card corresponding to the first card number. Then, in block 460, each of the remaining cards in the plurality of cards is individually activated. Thus, by a single message sent by the point-of-sale device, individual activation of the plurality of cards can take place as opposed to the point-of-sale device sending a plurality of activation requests to the activation system. Therefore, this process facilitates the speed with which a consumer can purchase cards and furthermore decreases the number of signals transmitted to the activation computer system. Thus, the activation computer system can make use of a batch process to implement the activation of a plurality of cards. Furthermore, by validating that the cards can be activated, the cards can be purchased before the activation process is completed. To the purchaser, however, it appears that the activation occurs in real time—even though the cards have only been validated as activatable. It is noted that the activation process need not start with the first card number, but flowchart 400 uses that as a logical example for demonstrating the activation process.

The signal sent from the point-of-sale device to the card validation system can be comprised of the first card number, the total number of cards, or alternatively, the last card number in the pack of cards. Furthermore, a batch number can be generated at the POS device and included as part of the activation request.

Alternatively, a batch number could be created at the validation computer or even the activation computer. Once assigned to a group of cards, the batch number can then be used to void the activation request at a later time in the procedure. Similarly, the batch number can be used for recordkeeping at the validation computer system and the activation computer system for tracking event records at each of those systems. In addition, the batch number can be reported back to the POS device so that the POS device can initiate a void procedure if the consumer decides not to purchase the cards.

The traditional way of selling gift cards in the past has been to present them at checkout stands hanging individually on display hangers. However, with the commercial success of such cards, consumers are now more inclined to purchase the items in bulk. For example, companies now recognize the value of rewarding employees, and gift cards are an easy way to reward a significant number of employees while allowing each employee to choose how to spend the monetary reward to that person's preferred taste. Thus, there is now a need to package the cards in such a way that they can easily be purchased in bulk without the risk of false activation of individual cards.

Figure 5:
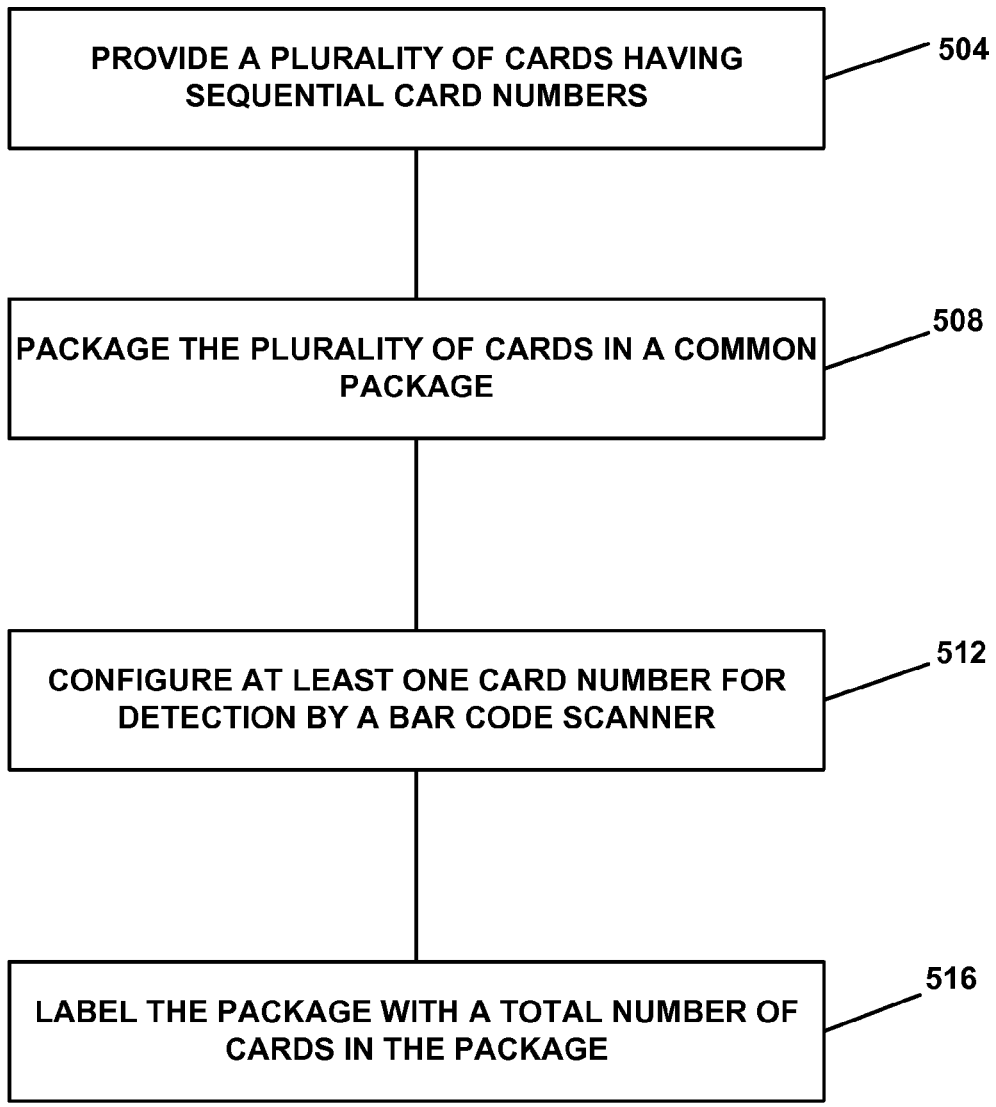
FIG. 5 illustrates a flowchart demonstrating a method for packaging a plurality of cards for activation according to one embodiment of the invention.

One method of doing this is to shrink wrap the cards such that a large sequential number of cards can be packaged together for easy purchase. However, to do so causes the individual card numbers to be obscured such that individual card numbers cannot be seen by the clerk or by a bar code scanner. Thus, one method of overcoming this obstacle is shown in FIG. 5. Namely, FIG. 5 illustrates a flowchart 500 for implementing a method of labeling packages for easy entry by a clerk at a point-of-sale device. In block 504, a plurality of cards are provided having sequential card numbers. In block 508, the plurality of cards are packaged into a common package, such as a shrink wrapped package. In block 512, the cards are configured within the package so that at least one card number can be detected such as by a bar code scanner or viewed by a clerk to hand key in the first card number. Furthermore, the package is also labeled with a total number of cards within the package as shown by block 516. Thus, when the package is presented at the checkout stand, the clerk can scan in the first number and hand key in the total number of cards. Alternatively, the package could be labeled with a bar code indicating the total number of cards that is also scanned in.

Figure 6:
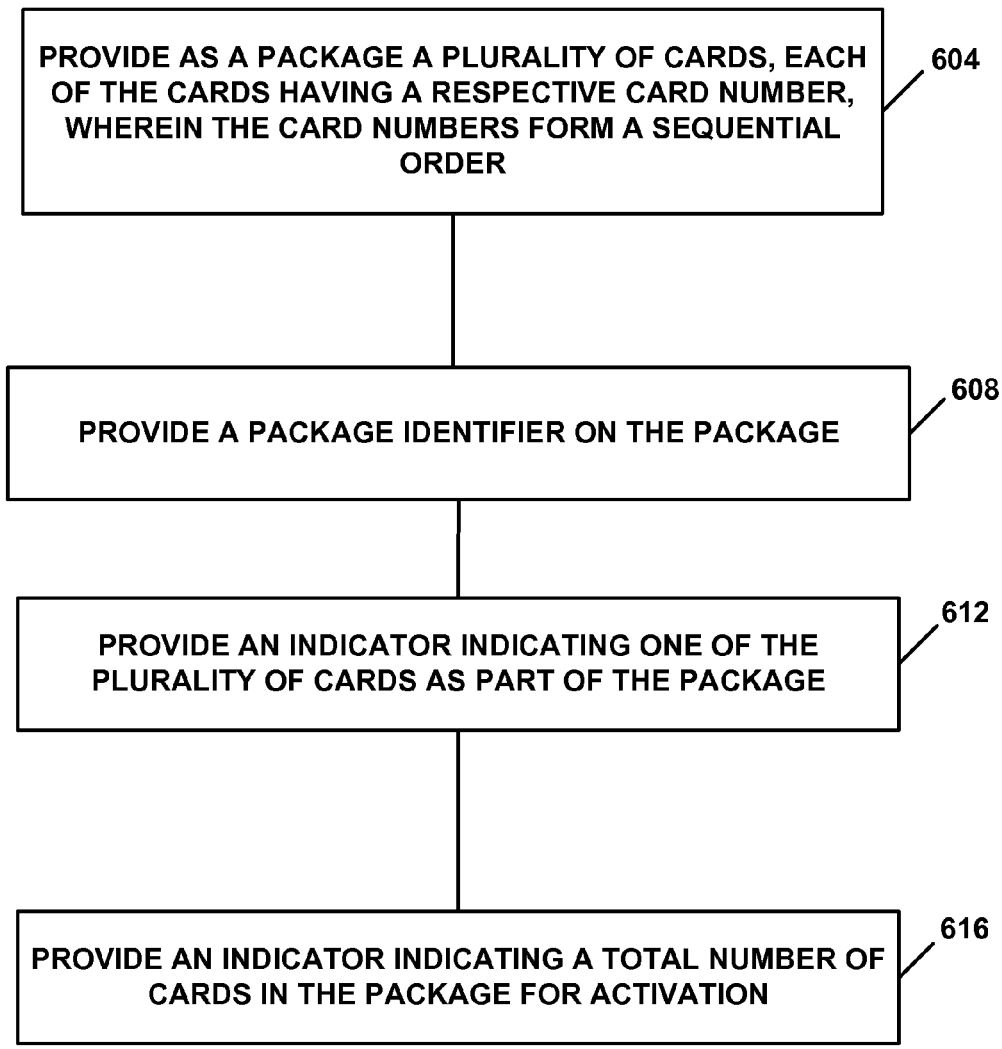
FIG. 6 illustrates a flowchart demonstrating a method for labeling a package of cards according to one embodiment of the invention.

Yet another embodiment of packaging the plurality of cards is shown in FIG. 6 by flowchart 600. In block 604, a plurality of cards are provided as a package. Each card has a respective card number and the card numbers form a sequential order. In block 608, a package identifier is provided on the package. In block 612, an indicator indicating one of the numbers of the plurality of cards is provided as part of the package. Furthermore, in block 616, an indicator indicating a total number of cards is provided as part of the package. Thus, in this alternative embodiment, a shrink wrapped group of cards can be labeled with a single label, for example, which is comprised of a card number and the total number of cards. Thus, when the bar code reader at the point-of-sale device scans the package, it knows not only the card number, but also the total number of cards to be activated. As a result, the algorithm at the validation computer can perform the validation process on the cards indicated by that set of numbers. Normally, this would involve validating the card identified by the card number and subsequent cards; but alternative algorithms could be used.

Another technique for validating multiple presentation instruments at a single time is by packing multiple presentation instruments in a group and providing a package identifier. In this way, when the package identifier is read and transmitted a host, a look up may be performed to determine which presentation instruments are in the package. As such, all presentation instruments in the package may be activated at the same time.

Conveniently, system 700 of FIG. 7 may be used to implement such a process. To do so, database 720 may include a set of package identifiers which are associated with different packages of presentation instruments. Also, database 720 may include a list of presentation instrument identifiers and/or account identifiers for each of the presentation instruments. Further, database 720 may include relational data which ties specific presentation instrument accounts to a specific package. This information may be transmitted to database 720 at the time of manufacture of the presentation instruments. For example, a group of ten presentation instruments may be packaged at a manufacturing location and packaged in a package that is identified by a package identifier. The package identifier along with the ten account identifiers in the package may be transmitted to database 720 to store this information. Also, a value may be associated with each of the account identifiers. For example, each of the ten presentation instruments may have a $50 value. In some cases, the value of each of the presentation instruments may be different, e.g., $25, $50, $100, etc. Database 720 may also include a purchase value for the entire package, which may simply be the sum of the individual presentation instrument values.

To purchase a package of presentation instruments, the identifier on or associated with the package may be read by point of sale device 704 and transmitted to validation computer system 712 which accesses database 720 to ensure that the particular package identifier is valid and perform a check to ensure that the purchase amount sent from the point of sale device 704 is the same as stored in database 720. If so, a confirmation may be sent back to point of sale device 704 which may print a receipt showing activation of each of the presentation instruments in the package. Also, each of the presentation instruments in the package are flagged as active in database 720 and may now be used to make purchases, also referred to as redemptions.

After activation, any one of the presentation instruments in the package may be used to make purchases by reading the account identifier from the presentation instrument using point of sale device 704 which transmits the redemption amount and the account identifier to validation computer system 712. In turn, system 712 accesses database 720 to ensure that the account is active and has sufficient stored value to cover the purchase. If so, the account is debited by the redemption amount and receipt information is transmitted back to point of sale device 704 where a receipt may be generated. Funds or other stored value may be added to an account in a similar manner.

Figure 8A:
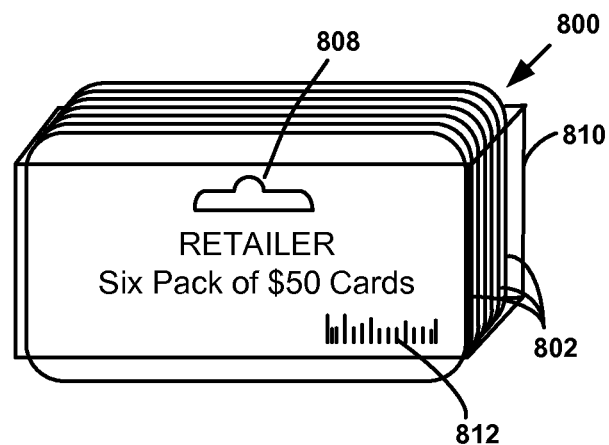
FIG. 8A is a front perspective view of a package of presentation instruments according to the invention.
Figure 8B:
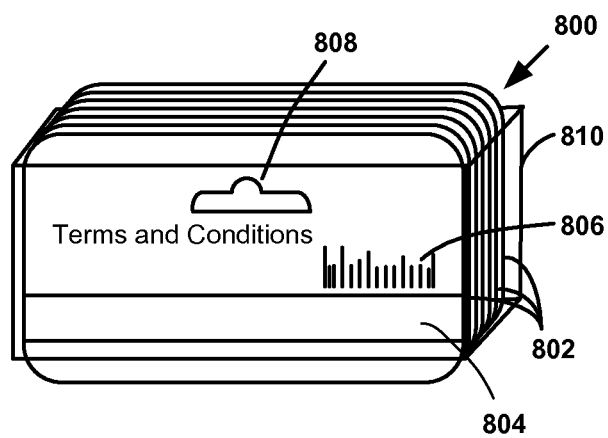
FIG. 8B is a rear perspective view of the package of FIG. 8A.

Referring now to FIGS. 8A and 8B, one embodiment of a package 800 of presentation instruments 802 will be described. As shown, package 800 includes six presentation instruments 802; however, it will be appreciated that any number may be packaged together. As best shown in FIG. 8B, each presentation instrument 802 includes a magnetic stripe 804, upon which is stored a unique presentation instrument identifier or account identifier. This number is used to associate a value with the presentation instrument at the host computer system. Alternatively, or in addition to, a bar code 806 may be used to store the presentation instrument identifier. Although not shown, presentation instrument 802 could also include a RF chip or other electronic storage device for storing the account number. Presentation instruments 802 may be constructed of a variety of materials, such as plastic, card stock and the like and may have essentially any shape, although one particular shape is similar to a CR-80 sized credit card. Presentation instruments 802 may also include other information, such as the name of the merchant, terms and conditions, advertising information and the like.

Optionally, presentation instruments 802 may include a through hole 808 that permits package 800 to be hung from a J-hook or other holding device at a point of sale location. Alternatively, no through hole may be provided, and package 800 may simply be placed on a shelf Package 800 further includes a shrink wrap material 810 which holds presentation instruments together as a package. Material 810 may be transparent or opaque and may be removed from the cards by tearing it away. Other kinds of materials that could be used include cardboard or plastic containers, ties, string or the like. Once package 800 is purchased, material 810 may be removed so that presentation instruments may be used as is known in the art.

Included on example material 810 is a bar code 812 which includes a package identifier. This identifier is used by the host computer system to identify which presentation instruments are included in the package. The bar code may comprise a stock keeping unit (SKU) which can be scanned by a point of sale device and also used for inventory purposes. Although shown stored as a bar code, other storage schemes may be used.

Figure 9:
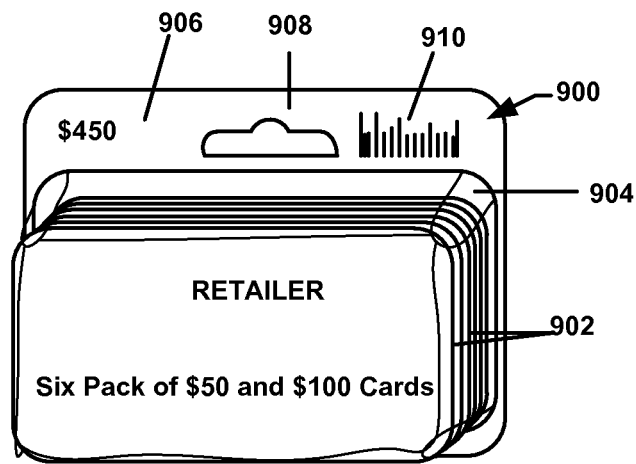
FIG. 9 is a front perspective view of another embodiment of a package of presentation instruments according to the invention.

FIG. 9 illustrates another package 900. Package 900 includes a set of presentation instruments 902 which may be similar to presentation instruments 802 except that presentation instruments 902 may be of different denominations. For example, three of the presentation instruments may have a value of $100 while three may have a value of $50. In this way, the total redemption amount $450. The purchase price of the package may be the same as the redemption amount, or may be different. For example, a merchant may sell the package at a discount. This information may be stored in the host computer.

Package 900 also includes packaging which is constructed of a clear plastic 904 coupled to a piece of card stock 906. In turn, card stock 906 includes a through hole 908 that permits package 900 to be hung from a J-hook at a point of sale location. Also, a bar code 910 may be placed on package 900 and includes a package identifier which may be used by the host computer to activate the presentation instruments in a manner similar to that previously described.

Figure 10:
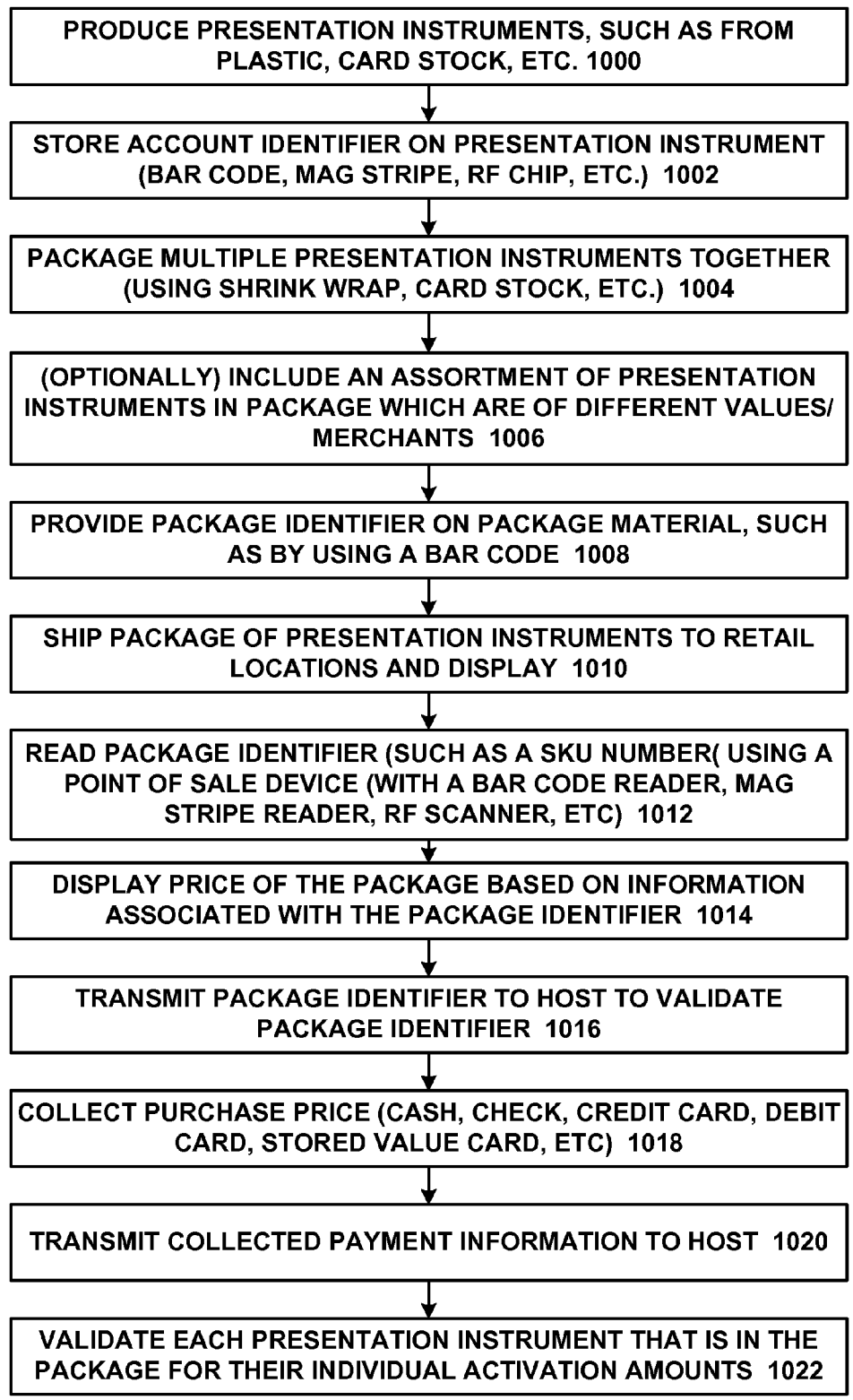
FIG. 10 is a flow chart illustrating one method for activating multiple presentation instruments according to the invention.

Referring now to FIG. 10, one method for activating multiple presentation instruments will be described. Initially, an assortment of presentation instruments are produced (step 1000). This may be from plastic, card stock, or the like. The presentation instruments are initialized by including an account identifier (step 1002). This may be done on a bar code, in text, on a mag strip, on a RF chip or the like. A group of presentation instruments are packaged together (step 1004) as a package. This may be done with shrink wrap, plastic, card stock, other containers or the like. Optionally, the presentation instruments may all be of the same value or different values. Also, the presentation instruments may all be redeemable at the same merchant or with an assortment of merchants (step 1006). In step 1008, a package identifier is provided on the package material. This may be done by bar code, text, mag stripe, chip or the like. The package identifier and account identifiers for each of the presentation instruments in the package may be stored in a database along with a value for each of the presentation instruments.

Once packaged, the package may be shipped to a retail location where it will be displayed for sale (step 1010). When sold, the package identifier is read (which may be a SKU number) using a point of sale device (step 1012). Once read, the point of sale device may display a price of the package which is obtained from the package identifier. This information may be obtained from a local store database (step 1014). The package identifier is also transmitted to a host computer system to validate the package identifier (step 1016). The host computer performs a look up to ensure the package identifier is included in its records. If so, the merchant may collect the purchase price using any payment vehicle, such as cash, check, credit card, debit card, stored value card, etc. (step 1018). The purchase price may be the same as or different from the total of the redemption amounts of the presentation instruments in the package. The collected payment information is transmitted to the host (step 1020). The host then validates each presentation instrument in the package for its particular value (step 1022). As such, the presentation instruments may now be used to make purchases or to add value to the accounts.

Figure 11:
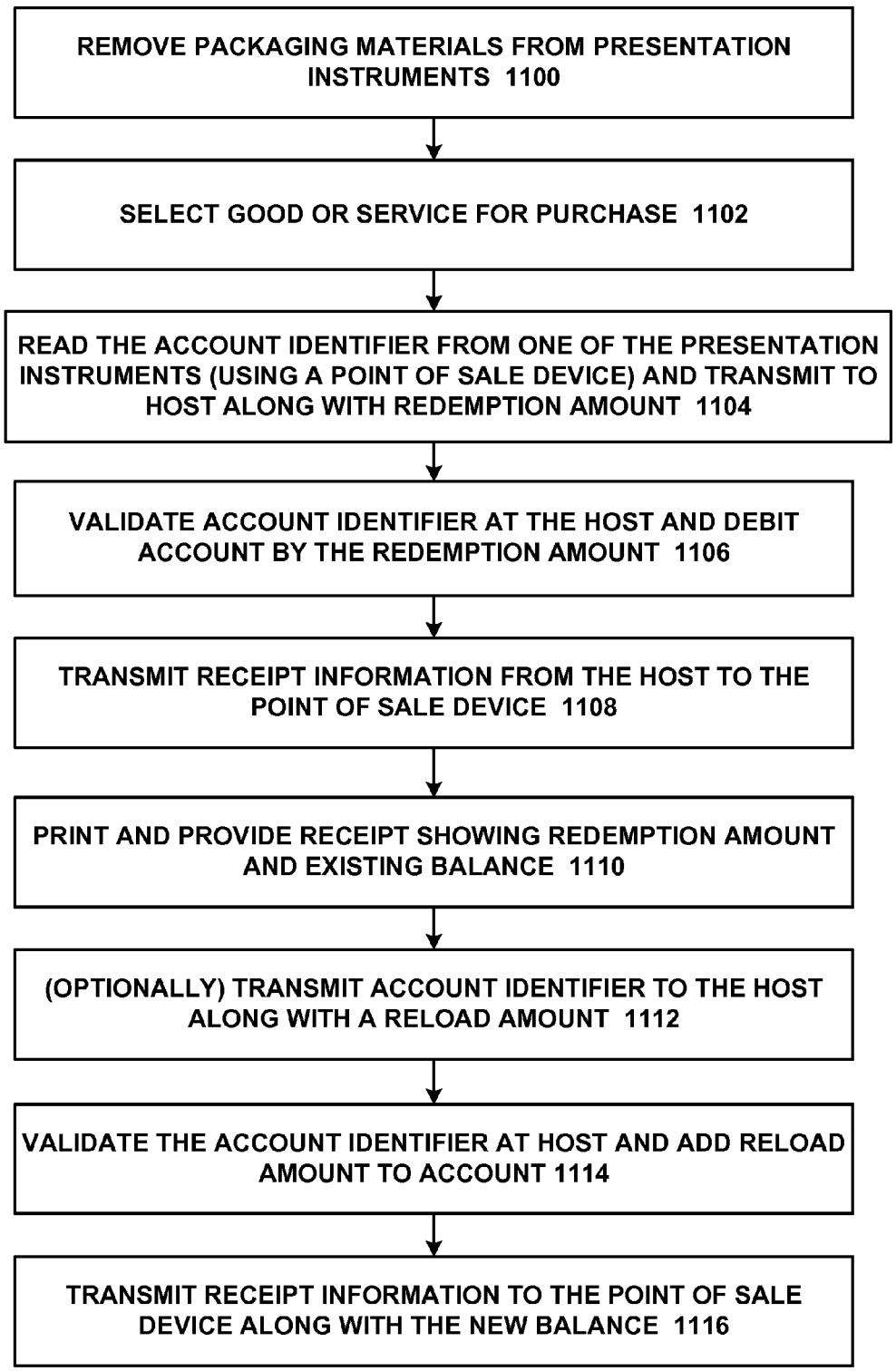
FIG. 11 is a flow chart illustrating one method for using a presentation instrument from a package to make a purchase or to add funds or other value to the account.

FIG. 11 illustrates a method for using a presentation instrument, once a package is purchased. The packaging is removed to expose the presentation instruments as shown in step 1100. A good or service is selected (step 1102) and rung up for purchase. The account identifier is read from the presentation instrument using a point of sale device and transmitted to the host computer along with a redemption amount (step 1104). The host computer validates the account and debits the account by the redemption amount (step 1106). Receipt information is transmitted from the host back to the point of sale device (step 1108). The point of sale device may then print a receipt showing the redemption amount and the current balance (step 1110).

In some cases, funds or other value may be added to an account. This may be done by reading the account identifier from the presentation instrument and transmitting it to the host along with a reload amount (step 1112). A reload amount is a kind of credit amount. Credits may occur in the form of a customer-initiated reload, a store refund, or in many other circumstances. The account identifier is validated at the host and the credit amount is added to the account (step 1114). Receipt information may be transmitted from the host to the point of sale device along with the new balance (step 1116). The point of sale device may then provide the receipt.

In some embodiments, a set of presentation instruments to be activated may include presentation instruments redeemable at different merchants. For the purposes of this disclosure, such a set will be described as containing disparate presentation instruments. Also for the purposes of this disclosure, to be redeemable at different merchants means that the set of merchants at which one presentation instrument is redeemable is not the same as the set of merchants at which another presentation instrument is redeemable. For example, if one presentation instrument is redeemable only at merchant A and another is redeemable only at merchant B, the presentation instruments are redeemable at different merchants and are disparate. Similarly, if one presentation instrument is redeemable only at merchants A, B, and C, and another presentation instrument is redeemable only at merchants B, C, and D, the presentation instruments are redeemable at different merchants and are disparate. If one presentation instrument is redeemable only at merchant A and another presentation instrument is redeemable only at merchants A and B, these two presentation instruments are redeemable at different merchants and are disparate.

Figure 12:
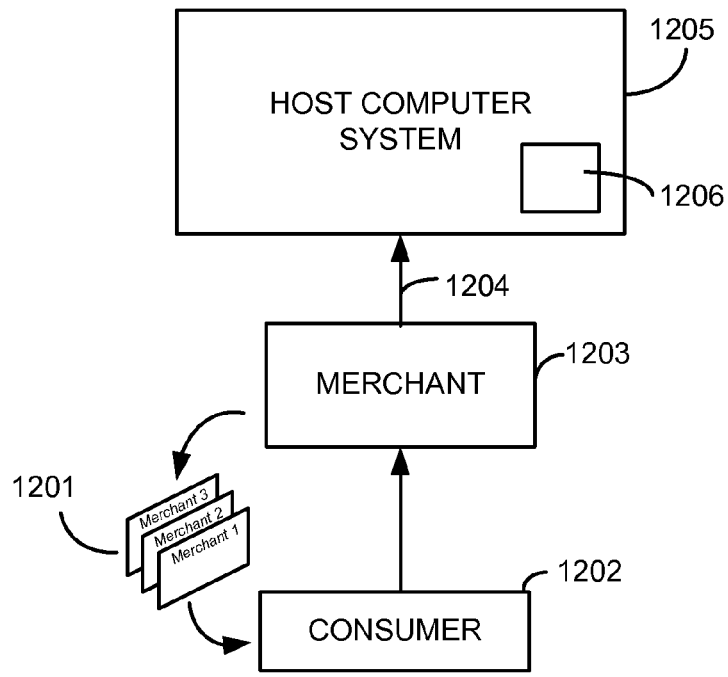
FIG. 12 depicts a system and method of activating multiple disparate stored value presentation instruments in accordance with an example embodiment of the invention.

Often, many different merchants use the same processing company to process the activation of stored value presentation instruments such as gift cards. A host computer at the processing company may contain a database or multiple databases that associate account information with the individual instruments from several different merchants. If all of presentation instruments in a package to be activated in accordance with an embodiment of the invention are from merchants who use the same processing company, the activation may proceed in a manner very similar to the activation of a group of presentation instruments from the same merchant. One example embodiment of this situation is depicted schematically in FIG. 12. An issuer has provided a set 1201 of disparate gift cards or other presentation instruments. Set 1201 comprises at least first and second presentation instruments redeemable at different merchants. In the example of FIG. 12, a consumer 1202 buys the set of presentation instruments from a merchant 1203. The merchant 1203 sends a message over an electronic network 1204 to a processing company host computer system 1205, the message containing a set identifier that identifies the set of presentation instruments. At the processing company, a list of the presentation instruments in the set 1201 is accessed, based on the set identifier, from one or more computer databases 1206 held by host computer system 1205, and all of the presentation instruments in set 1201 are activated at host computer 1205. In this and other embodiments, the list of presentation instruments may be but is not necessarily accessed all at once in its entirety. The items from the database may be accessed and processed individually or in subsets.

Some methods of providing centralized processing services for multiple merchants in the context of purchase cards are described in co-pending U.S. patent application Ser. No. 10/245,789, titled "Method and systems for providing merchant services with right-time creation and updating of merchant accounts", the complete disclosure of which is incorporated by reference herein.

Figure 13:
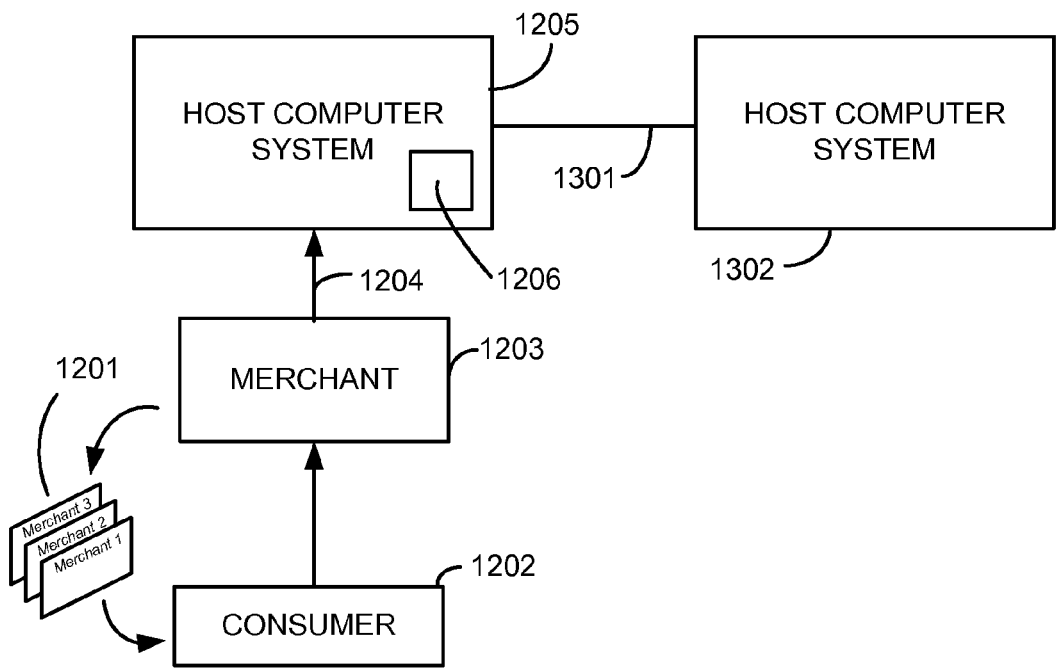
FIG. 13 depicts a system and method of activating multiple disparate stored value presentation instruments in accordance with another example embodiment of the invention.

Alternatively, the activation may be divided between two or more processing companies, for example when the set 1201 of presentation instruments contains instruments from merchants who used different processing companies. One example system and method for handling this situation is depicted in FIG. 13. In the example of FIG. 13, the transaction begins in the same way as in FIG. 12. A consumer 1202 buys or otherwise obtains the set 1201 of disparate presentation instruments from merchant 1203. Merchant 1203 sends a message over network 1204 to processing company host computer system 1205, the message comprising an identifier of the set. At the processing company, a list of the instruments in set 1201 is accessed, based on the set identifier, from database 1206 and host computer system 1205 activates those instruments from merchants that use the processing company for activation services. However, host computer system 1205 recognizes that at least one instrument in set 1201 is from a merchant that does not use the processing company housing host computer system 1205. Host computer system 1205 may send another message, over network 1301, to a second host computer system 1302 at a second processing company, the message identifying the presentation instrument not yet activated and indicating the instrument is to be activated. In this example, the second processing company is used by the merchant from which the unactivated instrument came. Host computer system 1302 can then activate the presentation instrument. The activations of instruments in set 1201 may be divided in any proportion between any number of processing companies. Before activation, each host computer system may perform appropriate checks to verify the validity of the transaction. Other details of activating gift cards or other stored value presentation instruments are disclosed in U.S. patent application Ser. No. 11/122,414, titled "System and method for accounting for activation of stored value cards", filed May 4, 2005, the entire disclosure of which is herein incorporated by reference.

Figure 14:
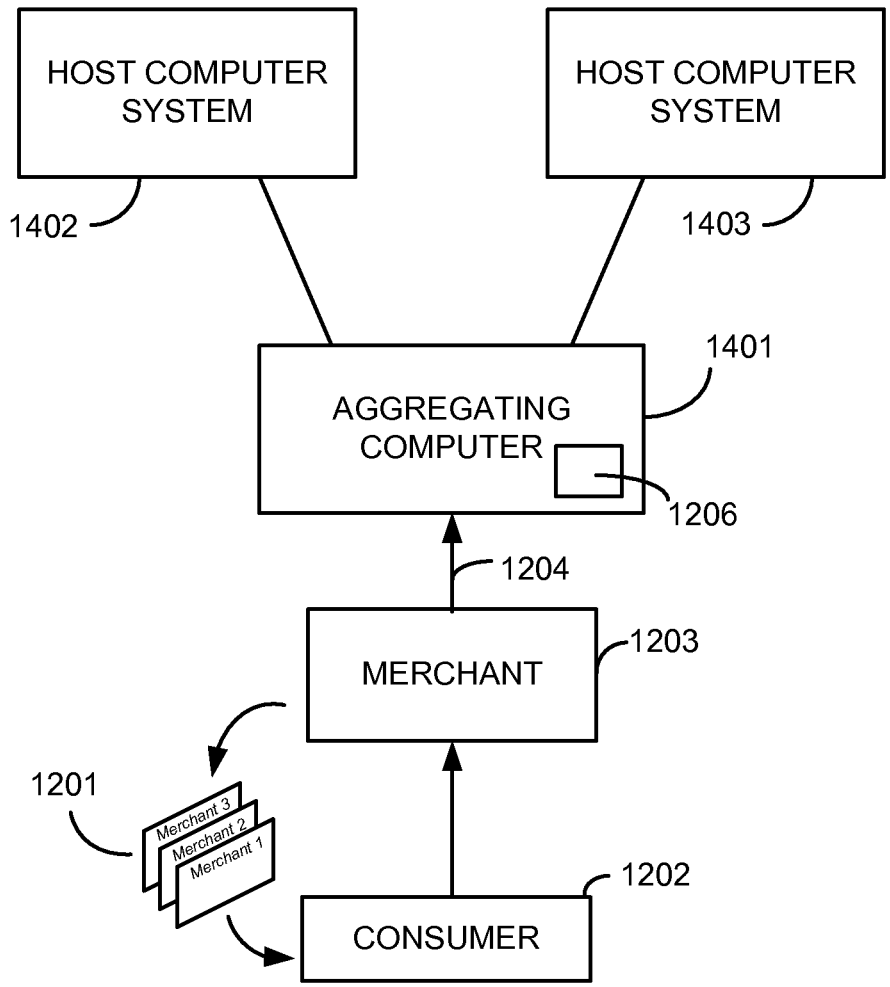
FIG. 14 depicts a system and method of activating multiple disparate stored value presentation instruments in accordance with another example embodiment of the invention.

In an arrangement in accordance with another example embodiment of the invention, an aggregator is introduced to handle some operations. This arrangement is depicted in FIG. 14. A transaction according to this example embodiment begins similarly to a transaction as depicted in FIGS. 12 and 13. A consumer 1202 buys or otherwise obtains a set 1201 of disparate presentation instruments. The set comprises instruments redeemable at different merchants. Merchant 1203, possibly using a point of sale device, sends a message over computer network 1204 to aggregating computer system 1401. The message comprises a set identifier identifying set 1201. Aggregating computer 1401 accesses from a database 1206 a list of the presentation instruments in set 1201, and then sends messages to one or more host computer systems 1402, 1403. For example, aggregating computer 1401 may recognize that a first of the instruments in set 1201 is from a merchant that uses a first processing company housing host computer system 1402, and may send a message to host computer system 1402 identifying the first presentation instrument and indicating that it is to be activated. Aggregating computer 1401 may also recognize that a second of the instruments in set 1201 is from a merchant that uses a second processor housing host computer system 1403, and may send a message to host computer 1403 identifying that second instrument and indicating that it is to be activated.

While only two host computers 1402 and 1403 are depicted in FIG. 14, it will be recognized that aggregating computer 1401 may communicate with any number of host computers. The database that associates the set identifier with the unique identifiers of the presentation instruments in set 1201 can reside at any location in the system, but conveniently it may reside at aggregation computer 1401 as depicted in FIG. 14.

Figure 15:
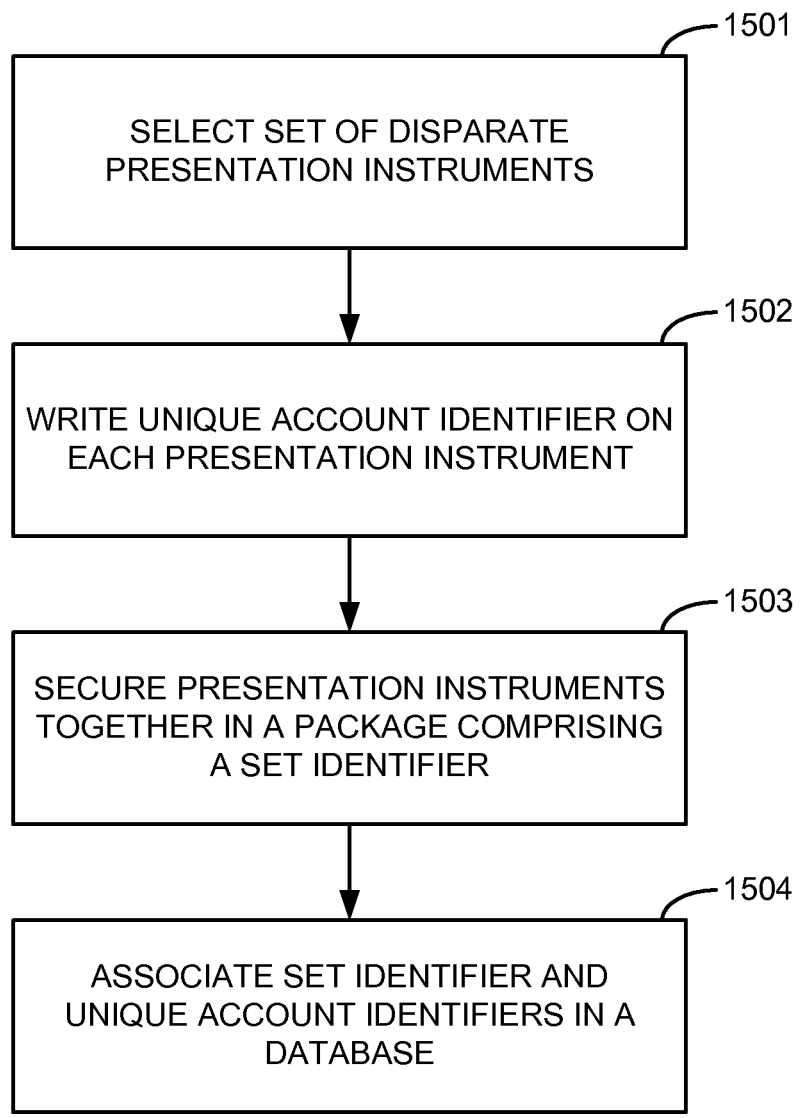
FIG. 15 is a flowchart of a method of producing a presentation instrument package, in accordance with an example embodiment of the invention.

Also conveniently, an aggregator may, in accordance with another example embodiment of the invention, produce sets of presentation instruments and organize a database that associates set identifiers with unique presentation instrument identifiers. A method in accordance with this example embodiment is illustrated in FIG. 15.

At step 1501, a set of presentation instruments is selected. At this step, the presentation instruments may be, for example, blank gift cards comprising magnetic stripes that have no data written on them, or blank tickets with no ticket number written on them. At step 1502, a unique account identifier is written on each of the presentation instruments. This process is sometimes called personalization of the instruments. The set of instruments comprises at least first and second presentation instruments redeemable at different merchants. At step 1503, the presentation instruments in the set are secured together with a package. The package may be of any type previously described or of another type, and comprises an identifier identifying the set of presentation instruments. At step 1504, the unique account identifiers of the presentation instruments in the set are associated with the set identifier in a computer database. In various embodiments, the database may be stored on a host computer, on an aggregating computer, or in another location.

Figure 16:
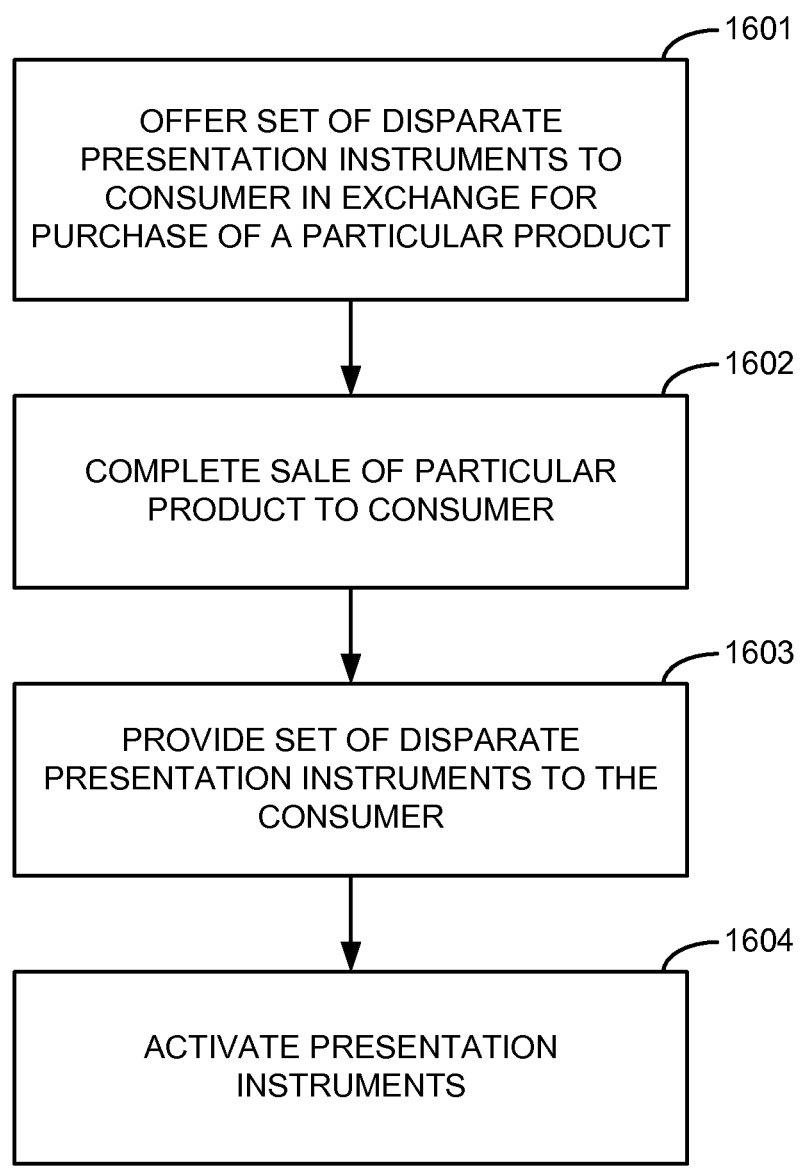
FIG. 16 is a flowchart of a method in accordance with an example embodiment of the invention.

In accordance with another example embodiment of the invention, a set of presentation instruments, redeemable at different merchants, may be offered to a consumer in return for the purchase of a particular product. In this embodiment, the provision of the instruments to the consumer functions in a way similar to a rebate that might be offered as an incentive for a consumer to purchase the particular product. A disadvantage of rebates is the complex and costly manual processing that they can incur for the offer or of the rebate. By contrast, a set of presentation instruments may be given to the consumer at the time of the sale as a form of "instant" rebate, and the redemption occurs using established and automated channels. A method in accordance with this example embodiment is illustrated in FIG. 16. In step 1601, the set of presentation instruments, redeemable at different merchants, is offered to a consumer in return for the purchase of a particular product. In step 1602, the sale of the particular product to the consumer is completed. In step 1603, the set of presentation instruments is provided to the consumer. In step 1604, each of the presentation instruments is activated by one of the methods already described. In this and other methods herein described, some steps may be performed an order different from that shown. For example, in FIG. 16, step 1604, activating the presentation instruments, may be performed before step 1603, providing the presentation instruments to the consumer. Systems and methods of offering rebates are disclosed in U.S. patent application Ser. No. 10/167,220, titled "Rebate issuance system and methods" and filed Jun. 10, 2002, and Ser. No. 10/238,044, titled "Rebate issuance and reconciliation systems and methods", filed Sep. 9, 2002, the complete disclosures of which have already been incorporated herein by reference.

In one embodiment, the presentation instruments are offered to the consumer by the manufacturer of the particular product and at the expense of the manufacturer. In another embodiment, the presentation instruments are offered to the consumer by the merchant at which the particular product is purchased. Alternatively, the manufacturer and the merchant may jointly offer the set of presentation instruments and may share in the expense of obtaining them. Yet another alternative is for one merchant to offer the presentation instruments as a reward or rebate and to jointly partner with other merchants to create the package. The set of presentation instruments may include any of the kinds of instruments already described, including gift cards, tickets, or other kinds of instruments, and may be physical objects or may be represented electronically.

In another example embodiment, the presentation instruments offered in return for the purchase of a particular product may remain redeemable for only a limited time, for example three months from the date of the purchase of the particular product. Any time period may be selected. This provision emulates the requirement that a rebate be claimed within a limited time after a product is purchased, and prevents the accumulation of an indefinite and ever-increasing liability for the issuer of the instruments. In one example implementation, at the time each presentation instrument is activated, a computer database is updated to reflect the last date upon which the instrument may be redeemed.

While a gift card or other stored value card serves as an example of a presentation instrument that may be activated according to the invention, it is to be understood that the invention may be embodied using many other kinds of presentation instruments. For example, a concert ticket is a kind of presentation instrument, as value (entrance to the concert) is generally exchanged for it upon its presentation. Similarly tickets to sporting events and entry tickets for amusement parks are other examples of presentation instruments with which the invention may be embodied. Systems and methods for activating tickets are described in U.S. Pat. No. 7,083,081, titled "Electronic card and ticket and methods for their use", and U.S. patent application Ser. No. 11/338,134, titled "Updating system for electronic tickets", filed Jan. 23, 2006, the complete disclosures of which are herein incorporated by reference.

While many examples have been given of presentation instruments that represent stored value in the form of currency, the stored value may be in other forms as well. For example, the stored value of a concert ticket is entry to the concert. Similarly, the stored value may be a quantity of goods of indeterminate price, such as "one four-course meal" at a particular restaurant, or may be a service, such as "three oil changes" at a service garage. The stored value may be in the form of a reward granted by a merchant, for example loyalty points or other value granted to a new customer or to reward frequent business. Many other forms of stored value are possible.

In accordance with one example embodiment of the invention, the presentation instruments in set 1201 are selected to conform with a theme. For example, a "date night" package of presentation instruments may include a gift card to a restaurant, tickets to a movie theater, concert, or sporting event, and a gift card to an ice cream parlor. Or a "movie night" package may include a gift card to a video rental store and a gift card to a take-out pizza restaurant. Or a "ski getaway" package may include a prepaid gasoline card, a voucher for lodging at a ski resort, and ski lift tickets. Many other examples are possible.

A presentation instrument need not be a physical object, but may be represented electronically, for example in a file stored on a handheld device such as a cellular telephone. For example, a cellular telephone provider may wish to store on new phones one or more one-time-use digital files that, when transmitted or presented to a merchant entitle the phone user to goods or services. These digital files are a form of presentation instrument.

Alternatively, such files may be downloaded to the electronic device from a computer that obtains them from a web site and transmits them to the device over, for example a Universal Serial Bus (USB) connection or other interface. A portable electronic device may download files directly, for example using a wireless access protocol. In each of these cases, upon purchase of the particular product, the consumer may be given a dial-in number or web address and a pass code that will enable downloading of the electronic presentation instrument. In an other example embodiment, a point-of-sale (POS) device may transmit the electronic presentation instruments directly to the handheld electronic device, for example using a Near Field Communications (NFC) signal or other communication method.

Redemption of such electronically-represented presentation instruments may be accomplished in various ways as well. In one example embodiment, a POS device comprises an NFC capability, and can communicate directly with the portable electronic device to accept data and instructions needed to redeem a presentation instrument. Alternatively, the handheld electronic device may transmit data and instructions to a computer that is connected to the Internet so that the presentation instrument may be redeemed as part of an online purchase. Other aspects of electronic commerce are described in provisional U.S. Patent Application No. 60/891,106, titled "Mobile commerce systems and methods", filed Feb. 22, 2007, the complete disclosure of which is herein incorporated by reference.

Similarly, the term "merchant" is intended to be interpreted broadly, and is not limited to a retail establishment selling goods. For the purposes of this disclosure, examples of merchants that may redeem a presentation instrument include, without limitation, a concert venue, a sporting event venue, an amusement park, an establishment selling services, and an establishment selling goods, including a retail store, chain store, franchise, restaurant, café, or other kind of establishment. Examples of merchants at which a consumer may obtain presentation instruments include, without limitation, a retail establishment selling goods or services, a concert venue, a sporting event venue, an amusement park, an online seller, and an establishment formed for the purpose of selling or distributing sets of presentation instruments, whether within another establishment, in a dedicated kiosk, doing business electronically over a computer network such as on the Internet, or in another location.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of activating a plurality of disparate stored value presentation instruments, the method comprising:
   providing a set of multiple presentation instruments, wherein each presentation instrument includes a unique presentation instrument identifier used to associate value with the presentation instrument, and wherein the set includes at least first and second presentation instruments, wherein the first presentation instrument is redeemable at a first set of merchants and the second presentation instrument is redeemable at a second set of merchants, wherein the first and second sets of merchants are different from each other and wherein no merchants in the first set of merchants is included in the second set of merchants;
   receiving, by a host computer system over an electronic network, a set identifier that identifies the set of presentation instruments;
   accessing from a computer database, based on the set identifier, a list of the presentation instruments in the set; and
   activating each presentation instrument in the set for a certain activation amount.

2. The method of claim 1, wherein at least one of the presentation instruments is a gift card.

3. The method of claim 1, wherein at least one of the presentation instruments is a ticket.

4. The method of claim 3, wherein the ticket is an admission ticket to a concert, sporting event, theater, amusement park, or ski lift.

5. The method of claim 1, wherein the set of presentation instruments is secured together by a package, and further comprising electronically reading the set identifier from the package at a point of sale using a reader selected form the set consisting of a bar code reader, a magnetic stripe reader, and an RF reader.

6. The method of claim 1, wherein each of the presentation instruments is represented electronically.

7. The method of claim 1, wherein at least one of the presentation instruments is activated for an amount different than an amount for which another of the presentation instruments is activated.

8. The method of claim 1, wherein providing the set of multiple presentation instruments further comprises selling the set to a consumer at a point of sale.

9. The method of claim 1, wherein providing the set of multiple instruments further comprises selling the set to a consumer over a computer network.

10. The method of claim 1, wherein the stored value associated with at least one of the presentation instruments is a service.

11. A presentation instrument package arrangement, comprising:
- a set of multiple physical presentation instruments, each presentation instrument having a unique account identifier stored thereon, each account identifier associated with a stored value account maintained on a host computer system, the set comprising first and second presentation instrument, wherein the first presentation instrument is redeemable at a first set of merchants and the second presentation instrument is redeemable at a second set of merchants, wherein the first and second sets of merchants are different from each other and wherein no merchant in the first set of merchants is included in the second set of merchants;
- a package securing the presentation instruments together; and
- a set identifier uniquely identifying the set of presentation instruments, the set identifier readable from the package by a point of sale device to activate each of the presentation instruments.

12. The presentation instrument package arrangement of claim 11, wherein at least one of the presentation instruments is a gift card.

13. The presentation instrument package arrangement of claim 11, wherein at least one of the presentation instruments is a ticket.

14. The presentation instrument package arrangement of claim 13, wherein the ticket is an admission ticket to concert, sporting event, theater, amusement park, or ski lift.

15. The presentation instrument package arrangement of claim 11, wherein the presentation instruments in the set are selected to conform with a theme.

16. The presentation instrument package arrangement of claim 11, wherein the set identifier is readable from the package by one of a bar code reader, a magnetic stripe reader, and an RF reader.

17. The presentation instrument package arrangement of claim 11, wherein the stored value associated with at least one of the presentation instruments is a service.

18. A method of producing a presentation instrument package, the method comprising:
- selecting a set of physical presentation instruments;
- storing a unique account identifier on each presentation instrument, the set comprising at least first and second presentation instruments, wherein the first presentation instrument is redeemable at a first set of merchants and the second presentation instrument is redeemable at a second set of merchants, wherein the first and second sets of merchants are different from each other and wherein no merchant in the first set of merchants is included in the second set of merchants;
- securing the presentation instruments together with a package, the package comprising a set identifier uniquely identifying the set of presentation instruments; and
- associating the unique account identifiers with the set identifier in a computer database.

19. The method of claim 18, further comprising storing the database on a host computer.

20. The method of claim 18, further comprising storing the database on an aggregating computer.

* * * * *